United States Patent
Asai

(10) Patent No.: US 9,124,842 B2
(45) Date of Patent: Sep. 1, 2015

(54) IMAGE DATA GENERATION METHOD, IMAGE RECORDING METHOD, IMAGE DATA GENERATION APPARATUS, AND IMAGE RECORDING APPARATUS

(71) Applicant: DAINIPPON SCREEN MFG. CO., LTD., Kyoto (JP)

(72) Inventor: Hiroshi Asai, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 14/466,685

(22) Filed: Aug. 22, 2014

(65) Prior Publication Data
US 2015/0062656 A1 Mar. 5, 2015

(30) Foreign Application Priority Data
Aug. 29, 2013 (JP) ................................. 2013-177743

(51) Int. Cl.
H04N 1/405 (2006.01)
H04N 1/40 (2006.01)
H04N 1/52 (2006.01)

(52) U.S. Cl.
CPC ......... *H04N 1/40087* (2013.01); *H04N 1/4053* (2013.01); *H04N 1/4056* (2013.01); *H04N 1/52* (2013.01)

(58) Field of Classification Search
CPC combination set(s) only.
See application file for complete search history.

(56) References Cited

U.S. PATENT DOCUMENTS

| | | | |
|---|---|---|---|
| 5,949,965 | A | 9/1999 | Gondek |
| 6,501,564 | B1 | 12/2002 | Schramm et al. |
| 2001/0019632 | A1 | 9/2001 | Shibaki et al. |
| 2006/0098045 | A1 | 5/2006 | Mizutani et al. |

FOREIGN PATENT DOCUMENTS

| | | |
|---|---|---|
| EP | 1331804 A2 | 7/2003 |
| JP | 11-010918 A | 1/1999 |
| JP | 2000-354172 A | 12/2000 |
| JP | 2010-241052 A | 10/2010 |

OTHER PUBLICATIONS

Extended European Search Report issued in European Application No. 14181332.9 dated Mar. 17, 2015.

*Primary Examiner* — Barbara Reinier
*Assistant Examiner* — Christopher D Wait
(74) *Attorney, Agent, or Firm* — McDermott Will & Emery LLP

(57) ABSTRACT

An image recording apparatus 1 generates halftone image data regarding black, cyan, magenta, and yellow from a multi-tone color image. Magenta is a target color component that has a lower ink density than that of the other color components. In generating halftone image data regarding magenta, the sum of the sizes of black, cyan, and magenta dots formed at a target pixel position is made smaller than or equal to a threshold dot size. If the hue of the pixel of interest is within a hue range in which magenta coloration is strong, it is determined that the threshold dot size is a corrected threshold dot size larger than the reference threshold dot size. It is thus possible to suppress overlapping of dots of a plurality of color components and to thereby improve color reproduction of the target color component while suppressing poor color reproduction and cockling.

23 Claims, 18 Drawing Sheets

IMAGE DATA GENERATION METHOD, IMAGE RECORDING METHOD, IMAGE DATA GENERATION APPARATUS, AND IMAGE RECORDING APPARATUS

RELATED APPLICATIONS

This application claims the benefit of Japanese Application No. 2013-177743, filed on Aug. 29, 2013, the disclosure of which is incorporated by reference herein.

TECHNICAL FIELD

The present invention relates to an image data generation method and apparatus for generating halftone image data through halftone processing performed on a multi-tone color image that includes images of a plurality of color components, and an image recording method and apparatus for recording an image onto a recording medium.

BACKGROUND ART

Image recording apparatuses that record color images onto recording media using an inkjet system by moving an ejection part relative to the recording media have conventionally been used, the ejection part having a plurality of nozzles arranged and each ejecting fine droplets of ink. Color images are recorded by forming ink dots at each pixel position on a recording medium on the basis of halftone image data that is generated through halftone processing. Such image recording apparatuses, however, may cause poor color reproduction due to colors becoming dull or cockling (a phenomenon where the surface of a recording medium becomes rippled) as a result of ink dots of multiple colors greatly overlapping at each pixel position on a recording medium.

Japanese Patent Application Laid-Open Nos. 11-010918 (Document 1) and 2000-354172 (Document 2) disclose methods for reducing graininess of images by recording only an ink dot of a single color at each pixel position. In Japanese Patent Application Laid-Open No. 2010-241052 (Document 3), halftone processing is performed on a color image on the basis of an evaluation index that indicates the degree of dispersion of overlapping of dots on a recording medium. This suppresses overlapping of dots and accordingly reduces graininess of the image.

Documents 1 and 2 can suppress dulling of color due to overlapping of multiple color dots, but it is difficult to represent dark mixed colors. In addition, if ink landing positions shift from their desired positions and change the overlapping state of multiple color dots, the influence of that change is greatly reflected in coloration. Document 3 can also suppress dulling of color due to overlapping of multiple color dots, but it gives no consideration to the total amount of ink applied to each pixel position. It is thus difficult to appropriately suppress cockling.

With these image recording apparatuses, ink of a specific color component may have a lower density than those of inks of the other color components, i.e., the ink of a specific color component may have a lower content of coloring material such as pigment than the inks of the other color components. In this case, if the amount of ink applied is restricted in order to suppress overlapping of dots, the color reproduction of the specific color component may deteriorate and it may not be possible to represent the desired hue when a region where the specific color component has a high tone value is written.

SUMMARY OF INVENTION

The present invention is intended for an image data generation method, and it is an object of the present invention to prevent dots of a plurality of color components from excessively overlapping one another when an image is recorded to thereby suppress poor color reproduction and cockling and to improve color reproduction of a color component that has a relatively low density.

An image data generation method according to the present invention generates halftone image data through halftone processing performed on a multi-tone color image that includes images of a plurality of color components. The image data generation method includes a) performing halftone processing on each image of at least one color component among the plurality of color components to generate single-color halftone image data regarding each of the at least one color component, the single-color halftone image data indicating sizes of a plurality of dots that are respectively to be formed at a plurality of pixel positions that are arranged in a matrix in a halftone image region, b) obtaining a hue of each pixel that corresponds to each pixel position in the color image, and in a case where the hue of the pixel is within a first hue range, determining that a threshold dot size at the pixel position for a target color component is a predetermined reference threshold dot size, the target color component being included in the plurality of color components and being one color component other than the at least one color component, and in a case where the hue of the pixel is within a second hue range in which coloration of the target color component is stronger than in the first hue range, determining that the threshold dot size is a predetermined corrected threshold dot size that is larger than the reference threshold dot size, and c) performing halftone processing on an image of the target color component with reference to the single-color halftone image data regarding the at least one color component to generate single-color halftone image data that indicates sizes of a plurality of dots of the target color component that are respectively to be formed at the plurality of pixel positions in the halftone image region.

The operation e) includes c1) performing halftone processing on one pixel in the image of the target color component and provisionally determining a size of a dot of the target color component that is to be formed at a pixel position corresponding to the one pixel, c2) obtaining a total dot size that is a sum of a previous total dot size and a provisional dot size, the previous total dot size being a sum of sizes of dots of the at least one color component that are to be formed at the pixel position, and the provisional dot size being the size of the dot of the target color component that is provisionally determined in the operation c1), c3) comparing the total dot size with a threshold dot size at the pixel position, and in a case where the total dot size is smaller than or equal to the threshold dot size, determining that the size of the dot of the target color component is a size equal to the provisional dot size, and in a case where the total dot size is larger than the threshold dot size, determining that the size of the dot of the target color component is a largest dot size that is within a range of a difference between the threshold dot size and the previous total dot size, c4) in a case where the total dot size is larger than the threshold dot size in the operation c3), changing a pixel value of a group of neighboring pixels at one or more pixel positions that are located around the one pixel and at which the size of the dot of the target color component has not yet been determined, on the basis of a pixel value of the one pixel and a difference between the provisional dot size and the size of the dot of the target color component, and c5) changing the one pixel to a next pixel in accordance with a predetermined processing order of the plurality of pixel positions and repeating the operations c1) to c4).

The image data generation method can prevent dots of a plurality of color components from excessively overlapping one another when an image is recorded to thereby suppress poor color reproduction and cockling and to improve color reproduction of a color component that has a relatively low density.

In a preferred embodiment of the present invention, the operations c1) to c4) are performed in sequential order from a pixel position at one end to a pixel position at the other end in a row or column of pixel positions in the halftone image region.

In another preferred embodiment of the present invention, in the operation c1), the provisional dot size is determined by comparing the pixel value of the one pixel with a threshold value that is set for the pixel position, and in the operation c), the threshold value is changed during repetition of the operations c1) to c4).

Another image data generation method according to the present invention includes a) performing halftone processing on each image of at least one color component among the plurality of color components to generate single-color halftone image data regarding each of the at least one color component, the single-color halftone image data indicating sizes of a plurality of dots that are respectively to be formed at a plurality of pixel positions that are arranged in a matrix in a halftone image region, b) obtaining a hue of each pixel that corresponds to each pixel position in the color image, and in a case where the hue of the pixel is within a first hue range, determining that a threshold dot size at the pixel position for a target color component is a predetermined reference threshold dot size, the target color component being included in the plurality of color components and being one color component other than the at least one color component, and in a case where the hue of the pixel is within a second hue range in which coloration of the target color component is stronger than in the first hue range, determining that the threshold dot size is a predetermined corrected threshold dot size that is larger than the reference threshold dot size, and c) performing halftone processing on an image of the target color component with reference to the single-color halftone image data regarding the at least one color component to generate single-color halftone image data that indicates sizes of a plurality of dots of the target color component that are respectively to be formed at the plurality of pixel positions in the halftone image region. The operation c) includes c1) performing halftone processing on the image of the target color component and provisionally determining sizes of the plurality of dots of the target color component that are respectively to be formed at the plurality of pixel positions in the halftone image region, c2) obtaining a total dot size that is a sum of a previous total dot size and a provisional dot size, the previous total dot size being a sum of sizes of dots of the at least one color component that are to be formed at a pixel position corresponding to one pixel in the image of the target color component, and the provisional dot size being the size of the dot of the target color component that is provisionally determined in the operation c1), c3) comparing the total dot size with a threshold dot size at the pixel position, and in a case where the total dot size is smaller than or equal to the threshold dot size, determining that the size of the dot of the target color component is a size equal to the provisional dot size, and in a case where the total dot size is larger than the threshold dot size, determining that the size of the dot of the target color component is a largest dot size that is within a range of a difference between the threshold dot size and the previous total dot size, c4) in a case where the total dot size is larger than the threshold dot size in the operation c3), changing a provisional dot size of a group of neighboring pixels at one or more pixel positions that are located around the one pixel and at which the size of the dot of the target color component has not yet been determined, on the basis of a difference between the provisional dot size of the one pixel of the target color component and the size of the dot of the target color component, and c5) changing the one pixel to a next pixel in accordance with a predetermined processing order of the plurality of pixel positions and repeating the operations c2) to c4).

The image data generation method can prevent dots of a plurality of color components from excessively overlapping one another when an image is recorded to thereby suppress poor color reproduction and cockling, and to improve color reproduction of a color component that has a relatively low density.

In a preferred embodiment of the present invention, the operations c2) to c4) are performed in sequential order from a pixel position at one end to a pixel position at the other end in a row or column of pixel positions in the halftone image region.

In another preferred embodiment, the image data generation method further includes extracting a pixel position at which it is determined in the operation a) that a dot of a predetermined size or more is to be formed for one of the at least one color component, and reducing the threshold dot size at a pixel position adjacent to the extracted pixel position.

In another preferred embodiment, single-color halftone image data regarding each of the plurality of color components is generated in a recording order in which the images of the plurality of color components are recorded onto a recording medium, and in the operation a), single-color halftone image data regarding black is first generated. In a case of generating single-color halftone image data regarding another color component other than black, if, at each pixel position, only a black dot is formed as a dot of a color component preceding the another color component in the recording order, a sum of sizes of the black dot and a dot of the another color component is smaller than or equal to a predetermined maximum dot size, and if the another color component is the target color component, the maximum dot size is increased as compared with a case where the another color component is a color component other than the target color component.

In another preferred embodiment, the image data generation method further includes the at least one color component includes black. The image data generation method further includes equating the threshold dot size at a pixel position at which it is determined in the operation a) that a black dot is to be formed and a size of the black dot.

In another preferred embodiment, the image data generation method further includes, prior to the operation a), performing separation processing along with gray-component replacement on the color image to generate a black image, a cyan image, a magenta image, and a yellow image.

The present invention is also intended for an image recording method of recording an image onto a recording medium. The image recording method includes preparing halftone image data that is generated by the above-described image data generation method, recording dots of the at least one color component onto a recording medium on the basis of the halftone image data, and recording dots of the target color component onto the recording medium on the basis of the halftone image data.

The present invention is also intended for an image data generation apparatus for generating halftone image data through halftone processing performed on a multi-tone color image that includes images of a plurality of color components. The image data generation apparatus according to the present invention includes at least one single-color halftone image data generation part that performs halftone processing on an image of at least one color component among the plurality of color components to generate single-color halftone image data regarding each of the at least one color component, the single-color halftone image data indicating sizes of a plurality of dots that are respectively to be formed at a plurality of pixel positions that are arranged in a matrix in a halftone image region, a threshold dot size determination part that obtains a hue of each pixel that corresponds to each pixel position in the color image, and in a case where the hue of the pixel is within a first hue range, determines that a threshold dot size at the pixel position for a target color component is a predetermined reference threshold dot size, the target color component being included in the plurality of color components and being one color component other than the at least one color component, and in a case where the hue of the pixel is within a second hue range in which coloration of the target color component is stronger than in the first hue range, determines that the threshold dot size is a predetermined corrected threshold dot size that is larger than the reference threshold dot size, and a target color component halftone image data generation part that performs halftone processing on an image of the target color component with reference to the single-color halftone image data regarding the at least one color component to generate single-color halftone image data that indicates sizes of a plurality of dots of the target color component that are respectively to be formed at the plurality of pixel positions in the halftone image region. The target color component halftone image data generation part includes a provisional size determination part that performs halftone processing on one pixel in the image of the target color component and provisionally determines a size of a dot of the target color component that is to be formed at a pixel position corresponding to the one pixel, a dot size totaling part that obtains a total dot size that is a sum of a previous total dot size and a provisional dot size, the previous total dot size being a sum of sizes of dots of the at least one color component that are to be formed at the pixel position, and the provisional dot size being the size of the dot of the target color component that is provisionally determined by the provisional size determination part, a size determination part that compares the total dot size with a threshold dot size at the pixel position, and in a case where the total dot size is smaller than or equal to the threshold dot size, determines that the size of the dot of the target color component is a size equal to the provisional dot size, and in a case where the total dot size is larger than the threshold dot size, determines that the size of the dot of the target color component is a largest dot size that is within a range of a difference between the threshold dot size and the previous total dot size, a pixel value changing part that, in a case where the total dot size is larger than the threshold dot size, changes a pixel value of a group of neighboring pixels at one or more pixel positions that are located around the one pixel and at which the size of the dot of the target color component has not yet been determined, on the basis of a pixel value of the one pixel and a difference between the provisional dot size and the size of the dot of the target color component, and a repetition control part that changes the one pixel to a next pixel in accordance with a predetermined processing order of the plurality of pixel positions and repeats the determination of the provisional dot size by the provisional size determination part, the calculation of the total dot size by the dot size totaling part, the determination of the size of the dot of the target color component by the size determination part, and the change of the pixel value by the pixel value changing part.

Another image data generation apparatus according to the present invention includes at least one single-color halftone image data generation part that performs halftone processing on an image of at least one color component among the plurality of color components to generate single-color halftone image data regarding each of the at least one color component, the single-color halftone image data indicating sizes of a plurality of dots that are respectively to be formed at a plurality of pixel positions that are arranged in a matrix in a halftone image region, a threshold dot size determination part that obtains a hue of each pixel that corresponds to each pixel position in the color image, and in a case where the hue of the pixel is within a first hue range, determines that a threshold dot size at the pixel position for a target color component is a predetermined reference threshold dot size, the target color component being included in the plurality of color components and being one color component other than the at least one color component, and in a case where the hue of the pixel is within a second hue range in which coloration of the target color component is stronger than in the first hue range, determines that the threshold dot size is a predetermined corrected threshold dot size that is larger than the reference threshold dot size, and a target color component halftone image data generation part that performs halftone processing on an image of the target color component with reference to the single-color halftone image data regarding the at least one color component to generate single-color halftone image data that indicates sizes of a plurality of dots of the target color component that are respectively to be formed at the plurality of pixel positions in the halftone image region. The target color component halftone image data generation part includes a provisional size determination part that performs halftone processing on the image of the target color component and provisionally determines sizes of the plurality of dots of the target color component that are respectively to be formed at the plurality of pixel positions in the halftone image region, a dot size totaling part that obtains a total dot size that is a sum of a previous total dot size and a provisional dot size, the previous total dot size being a sum of sizes of dots of the at least one color component that are to be formed at a pixel position corresponding to one pixel in the image of the target color component, and the provisional dot size being the size of the dot of the target color component that is provisionally determined by the provisional size determination part, a size determination part that compares the total dot size with a threshold dot size at the pixel position, and in a case where the total dot size is smaller than or equal to the threshold dot size, determines that the size of the dot of the target color component is a size equal to the provisional dot size, and in a case where the total dot size is larger than the threshold dot size, determines that the size of the dot of the target color component is a largest dot size that is within a range of a difference between the threshold dot size and the previous total dot size, a provisional size changing part that, in a case where the total dot size is larger than the threshold dot size, changes a provisional dot size of a group of neighboring pixels at one or more pixel positions that are located around the one pixel and at which the size of the dot of the target color component has not yet been determined, on the basis of a difference between the provisional dot size of the one pixel of the target color component and the size of the dot of the target color component, and a repetition control part that changes the one pixel to a next pixel in accordance with a predetermined processing order of the plurality of pixel positions and repeats the calculation of the total dot size by the dot size totaling part, the determination of the size of the dot of the target color component by the size determination part, and the change of the provisional dot size by the provisional size changing part.

The present invention is also intended for an image recording apparatus for recording an image onto a recording medium. The image recording apparatus includes the above-described image data generation apparatus, a dot output element that records a dot at a dot recording position on a recording medium, a movement mechanism that moves the dot recording position on the recording medium relative to the recording medium, and an output control part that performs output control of the dot output element on the basis of halftone image data that is generated by the image data generation apparatus, in parallel with the movement of the dot recording position on the recording medium relative to the recording medium.

In a preferred embodiment of the present invention, the dot output element includes at least one ejecting part that is controlled by the output control part on the basis of the single-color halftone image data regarding the at least one color component, and ejects a fine droplet of ink of the at least one color component to the dot recording position on the recording medium to record a dot of the at least one color component, and a target color component ejecting part that is controlled by the output control part on the basis of the target color component halftone image data, and ejects a fine droplet of ink of the target color component to the dot recording position on the recording medium to record a dot of the target color component. More preferably, the target color component has a lower ink density than the ink density of the at least one color component.

These and other objects, features, aspects and advantages of the present invention will become more apparent from the following detailed description of the present invention when taken in conjunction with the accompanying drawings.

DESCRIPTION OF EMBODIMENTS

Figure 1:
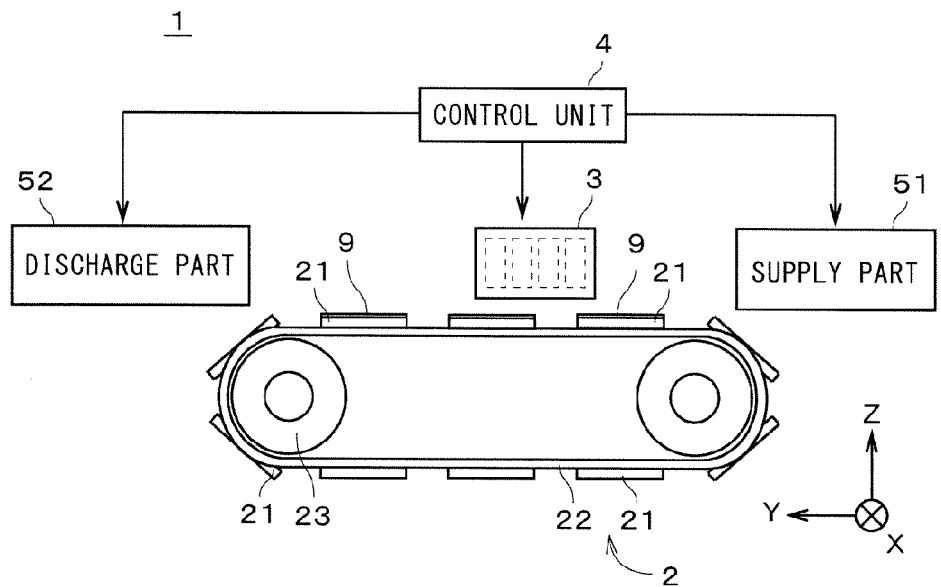
FIG. 1 illustrates a configuration of an image recording apparatus according to a first embodiment.

FIG. 1 illustrates a configuration of an image recording apparatus 1 according to a first embodiment of the present invention. The image recording apparatus 1 is a sheet-fed printing apparatus (so-called "inkjet printer") that sequentially records color images onto a plurality of recording media 9, which serve as printing paper, by ejecting fine droplets of ink on the recording media 9.

As illustrated in FIG. 1, the image recording apparatus 1 includes a movement mechanism 2 for moving the recording media 9 in a movement direction, which is the +Y direction in FIG. 1, an ejection unit 3 that ejects fine droplets of ink toward the recording media 9 that are being conveyed by the movement mechanism 2, a supply part 51 that supplies the recording media 9 to the movement mechanism 2, a discharge part 52 that receives the printed recording media 9 from the movement mechanism 2, and a control part 4 that controls these mechanisms. The ejection unit 3 is disposed above the movement mechanism 2 (on the +Z side) and fixed to a frame (not shown).

The movement mechanism 2 includes a plurality of stages 21, an annular guide 22, and a belt driving mechanism 23. The stages 21 each suction and hold a sheet of recording medium 9. The guide 22 includes a belt to which the stages 21 are connected, and guides the stages 21. The belt driving mechanism 23 moves the belt in the guide 22 counterclockwise in FIG. 1 so that the stages 21 on which the recording media 9 are held are moved in the +Y direction below the ejection unit 3 (i.e., on the −Z side).

Figure 2:
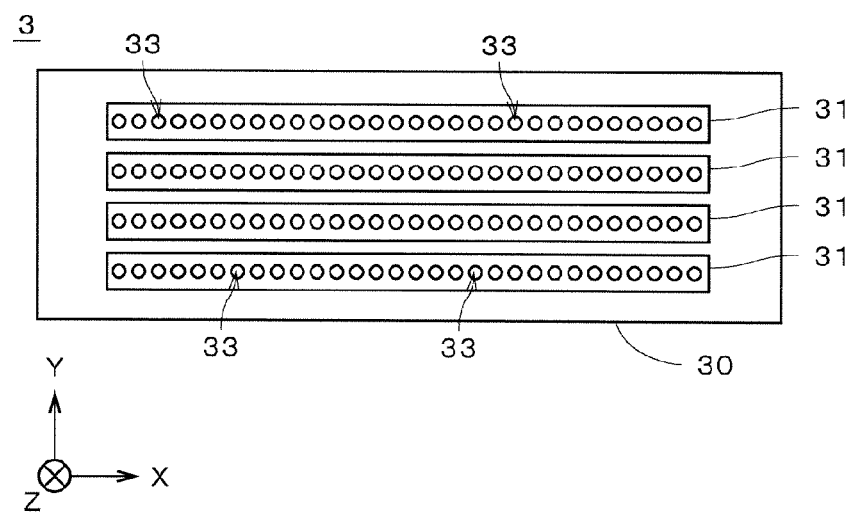
FIG. 2 is a bottom view of an ejection unit.

FIG. 2 is a bottom view of the ejection unit 3. The ejection unit 3 includes a plurality of (in the present embodiment, four) heads 31, each serving as an ejection part that ejects ink of a different color toward the recording media 9 and having the same structure. The heads 31 are arranged in the Y direction (i.e., movement direction) and attached to an attachment part 30 of the ejection unit 3. The heads 31 each have a plurality of outlets 33 arranged in the X direction that is perpendicular to the Y direction, which is the movement direction of the recording media 9. In FIG. 2, the number of outlets 33 illustrated is smaller than the actual number. Note that the outlets 33 do not necessarily have to be arranged in the X direction as long as they are arranged in a direction intersecting with the Y direction.

The size of a fine droplet of ink ejected from each outlet 33 of each head 31 is switchable (i.e., each outlet 33 can eject fine droplets of different amounts). As a result of the size of the droplets being switched and those droplets landing on a recording medium 9, the size of the dots to be formed on the recording medium 9 is also switched. In the present embodiment, the size of a fine droplet of ink ejected from each head 31 is switched among three types, namely a "large size," a "medium size" that is smaller than the large size, and a "small size" that is smaller than the medium size. Thus, the size of an ink dot to be formed on the recording media 9 is switched among the "large size," the "medium size," the "small size," and a "zero size" that indicates the absence of a dot. In the following description, a large-sized dot, a medium-sized dot, and a small-sized dot are also respectively referred to as a "large dot," a "medium dot," and a "small dot." In the present embodiment, the amount of a large-sized ink droplet is 9 pl (picoliters), the amount of a medium-sized ink droplet is 6 pl, and the amount of a small-sized ink droplet is 3 pl.

The head 31 on the most downstream side on the −Y side in FIG. 2 ejects black (K) ink, the head 31 on the +Y side of the black ink head 31 ejects cyan (C) ink, the head 31 on the +Y side of the cyan ink head 31 ejects magenta (M) ink, and the head 31 on the most upstream side on the +Y side ejects yellow (Y) ink. Note that the ejection unit 3 may also include inkjet heads or the like for other colors such as light cyan, light magenta, or white.

In the image recording apparatus 1, magenta ink has a lower density than those of inks of the other color components. In other words, magenta ink has a lower content of coloring marital such as pigment than inks of the other color components. This may cause deterioration in the color reproduction of magenta as compared with that of the other colors in the case of recording an image, which will be described later. In view of this, the image recording apparatus 1 performs correction as described below in order to improve the color reproduction of magenta to the same level of color reproduction as that of the other colors. That is, magenta is a target color component that is to be corrected.

In the image recording apparatus 1, the heads 31 are each disposed across the entire recording area of a recording medium 9 in the X direction (in the present embodiment, across the entire width of the recording medium 9 in the X direction). The ejection unit 3 and the movement mechanism 2 are controlled by an output control part 41 (see FIG. 3) of the control part 4. The recording of an image to a recording medium 9 is completed by the ejection unit 3 sequentially ejecting black, cyan, magenta, and yellow inks onto the recording medium 9, as a result of the recording medium 9 passing over positions facing the heads 31 of the ejection unit 3 only once in the +Y direction.

In other words, the image recording apparatus 1 performs single-pass printing on a recording medium 9. Specifically, the ejection unit 3 serving as a dot output element ejects fine droplets of ink from the outlets 33 of each head 31 to record dots at a plurality of dot recording positions that are arranged across the entire width of the recording medium 9 in a width direction perpendicular to the aforementioned movement direction, and the movement mechanism 2 moves the dot recording positions on the recording medium 9 only once in the movement direction relative to the recording medium 9. Assuming here that black is a first color, cyan is a second color, magenta is a third color, and yellow is a fourth color, the four heads 31 of the ejection unit 3 are respectively referred to as a first ejection part for recording dots of the first color, a second ejection part for recording dots of the second color, a third ejection part for recording dots of the third color, and a fourth ejection part for recording dots of the fourth color, in order from the −Y side.

Figure 3:
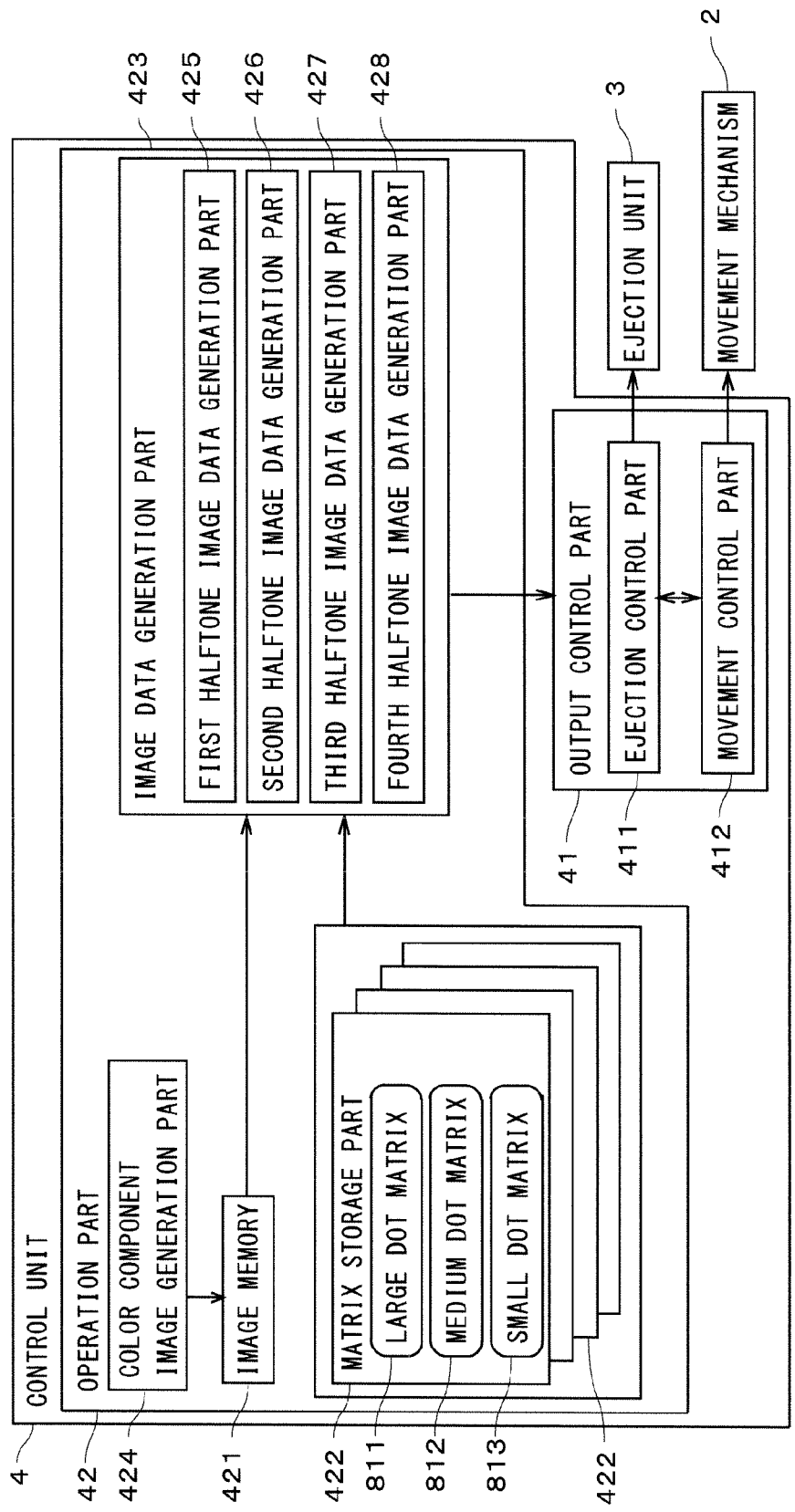
FIG. 3 is a block diagram illustrating functions of a control unit.

The control unit 4 is configured as a general computer system in which a CPU that performs various types of computational processing, a ROM that stores a basic program, and a RAM that stores various types of information are connected to a bus line. FIG. 3 is a block diagram showing functions of the control unit 4. In FIG. 3, part of the configuration of the image recording apparatus 1 that is connected to the control unit 4 is illustrated together. The control unit 4 includes the aforementioned output control part 41, and an operation part 42 that performs various types of calculations.

The operation part 42 includes an image memory 421, a plurality of matrix storage parts 422 (also, referred to as "screen pattern memories (SPMs)"), an image data generation part 423 (halftoning circuit), and a color component image generation part 424. The color component image generation part 424 performs separation processing along with gray-component replacement (GCR) on a multi-tone color image that is input from the outside. The gray component replacement refers to processing for representing gray portions, which are represented by superimposing cyan, magenta, and yellow dots, by only shades of black ink so as to reduce the amounts of cyan, magenta, and yellow inks applied to the gray portions.

This produces a tone image of black, which is a first color component of the color image, a tone image of cyan, which is a second color component, a tone image of magenta, which is a third color component, and a tone image of yellow, which is a fourth color component. In the following description, the tone images of black, cyan, magenta, and yellow generated by the color component image generation part 424 are respectively referred to as a "first color component image," a "second color component mage," a "third color component image." and a "fourth color component image." The first to fourth color component images are also collectively referred to as a "color component image."

Data regarding the first to fourth color component images (hereinafter, also collectively referred to as "color component image data") is stored in the image memory 421. The matrix storage parts 422 are memories in which threshold matrices corresponding to the first to fourth color components are respectively stored.

The matrix storage parts 422 each store a large dot matrix 811 that is a threshold matrix for large dots, a medium dot matrix 812 that is a threshold matrix for medium dots, and a small dot matrix 813 that is a threshold matrix for small dots. The large dot matrix 811, the medium dot matrix 812, and the small dot matrix 813 are each a threshold matrix used in frequency modulated (FM) screening in which tones are represented by changing the number of randomly arranged dots.

Although FIG. 3 illustrates only the large dot matrix 811, the medium dot matrix 812, and the small dot matrix 813 that are stored in one of the matrix storage parts 422, the matrix storage parts 422 for the other color components each also store a large dot matrix 811, a medium dot matrix 812, and a small dot matrix 813. In the following description, the three threshold matrices including the large dot matrix 811, the medium dot matrix 812, and the small dot matrix 813 are also collectively referred to as a "matrix set." Regarding the same position in the three threshold matrices, the threshold value in the large dot matrix 811 is the greatest and the threshold value in the small dot matrix 813 is the smallest. The threshold value in the medium dot matrix 812 is a value between the threshold value in the large dot matrix 811 and the threshold value in the small dot matrix 813.

Figure 4:
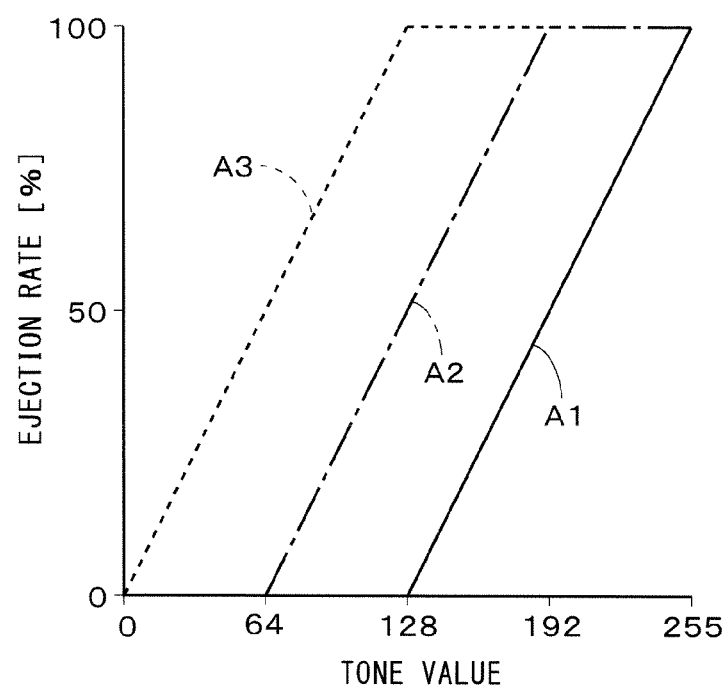
FIG. 4 illustrates characteristics of a matrix set.

FIG. 4 illustrates characteristics of a matrix set. In FIG. 4, the vertical axis indicates the ejection rate of ink of each color component when an image having a uniform tone value is recorded by the image recording apparatus 1 and the horizontal axis indicates the tone value of an image of each color component. The aforementioned ejection rate is a value indicating the proportion of the number of dots that are actually ejected and formed per unit area on a recording medium 9 from one of the heads 31 relative to a reference number of dots that is the number of recording positions that are defined as ink-dot formable positions in the unit area.

In FIG. 4, the ejection rate of large-sized fine droplets of ink is indicated by a solid line A1. In the following description, the ejection rates of large-, medium-, and small-sized fine droplets of ink are respectively referred to as a "large dot ejection rate," a "medium dot ejection rate." and a "small dot ejection rate." In FIG. 4, the sum of the large dot ejection rate and the medium dot ejection rate is indicated by a dashed dotted line A2, and a total ejection rate that is an ejection rate of all different-sized fine droplets of ink is indicated by a broken line A3.

The threshold values in the large dot matrix 811 range from 128 to 254, the threshold values in the medium dot matrix 812 range from 64 to 191, and the threshold values in the small dot matrix 813 range from 0 to 127. As described previously, at the same position in the three matrices in a matrix set, the threshold value in the medium dot matrix 812 is greater than that in the small dot matrix 813, and the threshold value in the large dot matrix 811 is greater than that in the medium dot matrix 812. When a large dot is formed at one position, neither a small nor a medium dot is recorded at that position even if the input pixel value exceeds the threshold values. When a medium dot is formed at one position, a small dot is not recorded at that position even if the input pixel value exceeds the threshold value.

As illustrated in FIG. 4, the ejection rate of only small dots linearly increases from 0% to 50% as indicated by the broken line A3 as the tone value in the image increases from 0 to 64. As the tone value increases from 64 to 128, the total ejection rate linearly increases from 50% to 100% as indicated by the broken line A3, and the medium-dot ejection rate linearly increases from 0% to 50% as indicated by the dashed dotted line A2. A difference between the broken line A3 and the dashed dotted line A2 corresponds to the small-dot ejection rate, and the small-dot ejection rate remains constant irrespective of the increase in tone value.

As the tone value increases from 128 to 192, the total ejection rate remains at 100% as indicated by the broken line A3, the sum of the large-dot ejection rate and the medium-dot ejection rate linearly increases from 50% to 100% as indicated by the dashed dotted line A2, and the large-dot ejection rate linearly increases from 0% to 50% as indicated by the solid line A1. A difference between the broken line A3 and the dashed dotted line A2 corresponds to the small-dot ejection rate, and the small-dot ejection rate decreases with increasing tone value. A difference between the dashed dotted line A2 and the solid line A1 corresponds to the medium-dot ejection rate, and the medium-dot ejection rate remains constant irrespective of the increase in tone value.

As the tone value increases from 192 to 255, the total ejection rate remains at 100%, and the sum of the large-dot ejection rate and the medium-dot ejection rate also remains at 100% as indicated by the dashed dotted line A2. The large-dot ejection rate linearly increases from 50% to 100% as indicated by the solid line A1. A difference between the dashed dotted line A2 and the solid line A1 corresponds to the medium-dot ejection rate, and the medium-dot ejection rate decreases with increasing tone value. The small-dot ejection rate is 0%, i.e., small-sized fine droplets of ink are not ejected.

In the case of generating a threshold matrix corresponding to each dot size in a matrix set, a threshold matrix serving as a basis is created by, for example, a method disclosed in Japanese Patent Application Laid-Open No. 2008-199154, the disclosure of which is herein incorporated by reference, and an offset value is added to each threshold value so that the range of the threshold value is narrowed as necessary and the minimum threshold value is suitable for tone values that will appear in dots of that size.

The image data generation part 423 illustrated in FIG. 3 is a comparison part for comparing the color component image data with threshold matrices for each color component to generate halftone image data. The image data generation part 423 includes a first halftone image data generation part 425 for comparing the first color component image with the threshold matrices corresponding to the first color component, a second halftone image data generation part 426 for comparing the second color component image with the threshold matrices corresponding to the second color component, a third halftone image data generation part 427 for comparing the third color component image with the threshold matrices corresponding to the third color component, and a fourth halftone image data generation part 428 for comparing the fourth color component image with the threshold matrices corresponding to the fourth color component. Note that the image data generation part 423 may be implemented by software.

The output control part 41 includes an ejection control part 411 and a movement control part 412. The movement control part 412 controls the movement of the recording media 9 relative to the ejection unit 3 by the movement mechanism 2, on the basis of output front the image data generation part 423. The ejection control part 411 controls the ejection of ink from the outlets 33 of each head 31 in synchronization with the movement of the recording media 9 on the basis of the output from the image data generation part 423. In other words, the output control part 41 performs output control of the dot output element on the basis of the halftone image data generated by the image data generation part 423, in parallel with the movement of a plurality of dot recording positions on the recording medium 9 relative to the recording medium 9.

Figure 5:
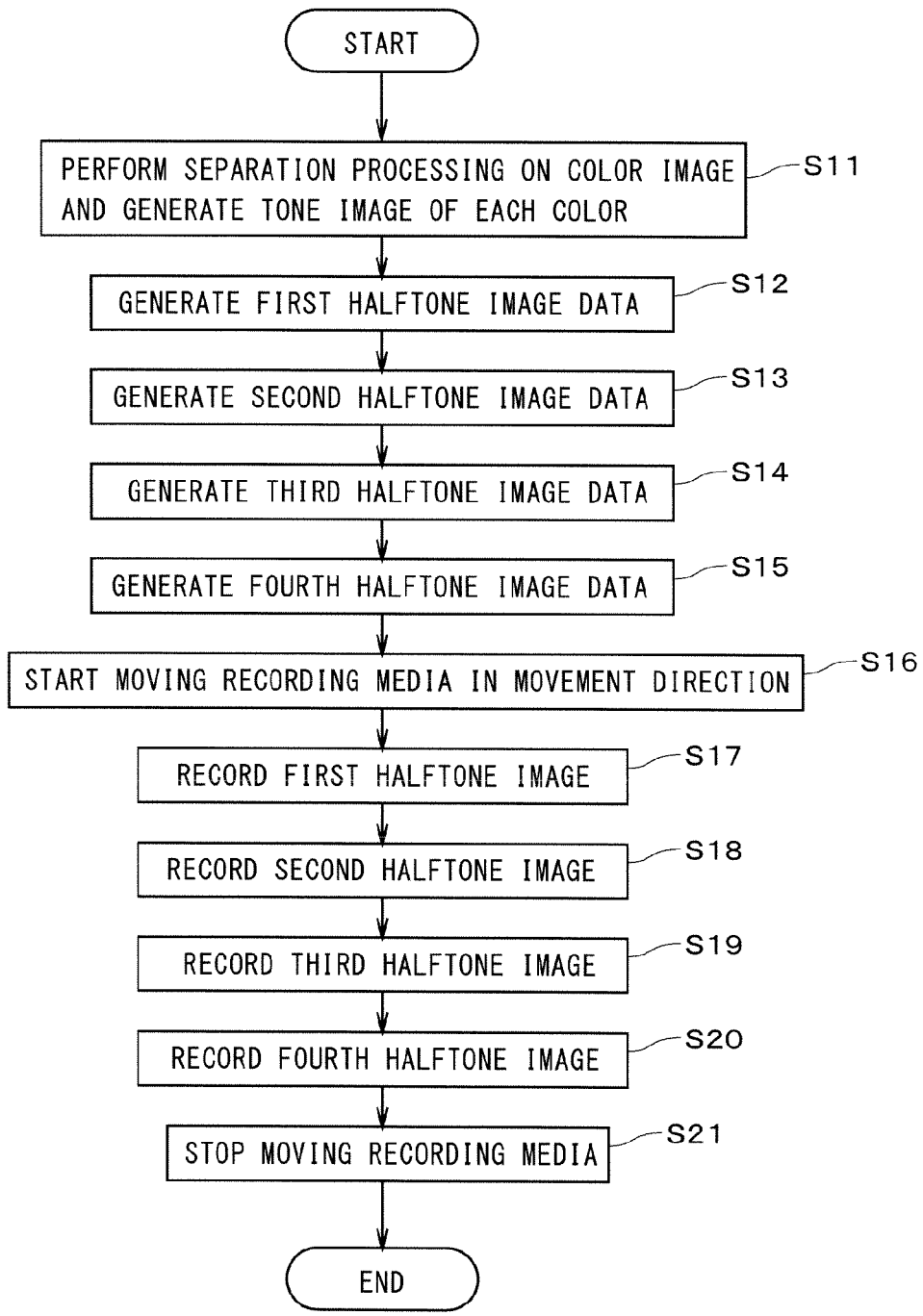
FIG. 5 illustrates the procedure of image recording performed by the image recording apparatus.

Next, the operation of the image recording apparatus 1 recording an image will be described with reference to FIG. 5. In the following description, the recording of dots is referred to as "writing." and expressions such as "an image is recorded" by writing a plurality of dots is used, but there is no need to strictly distinguish between "writing" and "recording." FIG. 5 illustrates the procedure of image recording, focusing on one of the recording media 9. In the image recording apparatus 1, the four matrix storage parts 422 of the operation part 42 illustrated in FIG. 3 respectively store the four matrix sets used for halftoning of the first to fourth color component images. The color component image generation part 424 receives input of data regarding a multi-tone color image from an external computer. The tone values for each color component of the color image (i.e., pixel values that can be taken by the pixels in each color component image) range from 0 to 255. A tone value of 0 corresponds to an image density of 0% and is represented by an ink dot not being formed. A tone value of 255 corresponds to an image density of 100% (solid color) and is represented by a large ink dot. Specifically, in the image recording apparatus 1, the amount of an ink droplet of each color component that corresponds to the image density of 100% is 9 pl.

A case where the color image is a tint image of a first hue and a case where the color image is a tint image of a second hue will now be described in this order. The first hue is bluish purple, and the second hue is reddish purple. When represented in the L*a*b colorimetric system, the first hue has a chromaticity of $a^*>0$ and $-100 \leq b^* \leq -50$, and the second hue has a chromaticity of $a^*>0$ and $-50<b^*<0$. In the L*a*b colorimetric system, a* shows red in the positive direction and green in the negative direction, and b* shows yellow in the positive direction and blue in the negative direction. The ranges of a* and b* are both greater than or equal to −100 and less than or equal to 100.

In the case of recording the color image of the first hue, first the color component image generation part 424 performs separation processing along with gray-component replacement on the color image of the first hue. This produces a black tone image having a tone value of 153 (image density of 60%), a cyan tone image having a tone value of 204 (image density of 80%), a magenta tone image having a tone value of 128 (image density of 50%), and a yellow tone image having a tone value of 0 (image density of 0%) (step S11). The first hue is a hue in which blue is more predominant than red. The color component images generated by the component image generation part 424 are stored in the image memory 421.

Then, the first halftone image data generation part 425 compares the pixel value (in the present embodiment, 153) of each pixel in the black tone image, which is the first color component image, with a threshold value in the matrix set for black. Through this, halftone processing is performed on the black tone image (i.e., the black tone image is halftoned), and first halftone image data is generated for use in recording a black image (step S12).

Figure 6:
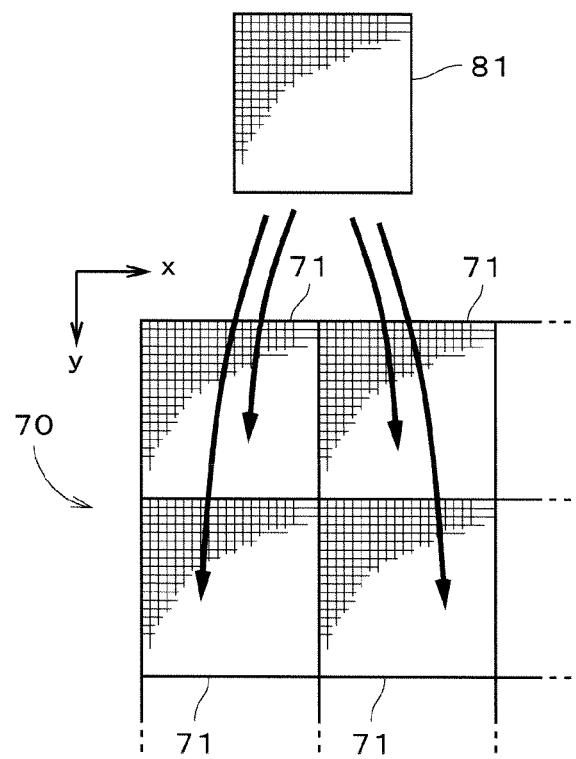
FIG. 6 illustrates a tone image and a threshold matrix.

Here, halftoning (generating halftone dots) of a tone image will be described. FIG. 6 is an abstract view of a tone image and a threshold matrix. In FIG. 6, one threshold matrix in a matrix set is indicated by reference numeral 81. The threshold matrix 81 has a plurality of elements arranged in row and column directions, the row direction corresponding to the width direction of the recording media 9 (indicated as the x direction in FIG. 6), and the column direction corresponding to the movement direction (indicated as the y direction in FIG. 6). A tone image 70 has a plurality of pixels arranged in the row and column directions.

In the case of halftoning the tone image 70, the tone image 70 is divided into a large number of areas of the same size so as to set repetitive areas 71 that are units of halftoning as illustrated in FIG. 6. The matrix storage parts 422 in FIG. 3 each have a storage area corresponding to a single repetitive area 71 and store the threshold matrix 81 in which threshold values are set at each address (coordinates) in the storage area. Conceptually, each of the repetitive areas 71 of the tone image 70 is superimposed on the threshold matrix 81, and the pixel value of each pixel in the repetitive area 71 is compared with the corresponding threshold value in the threshold matrix 81. The comparison between the pixel value and the threshold value is performed using the three threshold matrices corresponding to the three types of dot sizes (i.e., the large dot matrix 811, the medium dot matrix 812, and the small dot matrix 813). This determines whether or not to write a dot at each pixel position on a recording medium 9, and the size of the dot to be written.

In the actual operation, the pixel value of one pixel in the tone image 70 is read out from the image memory 421 on the basis of an address signal received from an address generator of the image data generation part 423 in FIG. 3. Meanwhile, the address generator generates an address signal indicating the position of that pixel in the repetitive area 71, and three threshold values in the large dot matrix 811, the medium dot matrix 812, and the small dot matrix 813 are specified and read out from the matrix storage part 422. The image data generation part 423 then compares the above pixel value with the three threshold values, so that the sizes of a plurality of dots that are respectively to be formed at a plurality of pixel positions (i.e., a plurality of writing positions) arranged in a matrix in a halftone image region, which is a region in the output image, are sequentially determined.

Specifically, the pixel value of each pixel in the tone image 70 (hereinafter, an "input pixel value") is compared with a threshold value in the large dot matrix 811 at a pixel position corresponding to the pixel in the halftone image region, and if the input pixel value is greater than the threshold value, a value of "3" is assigned to that pixel position. Hereinafter, a value in the halftone image is referred to as a "halftone pixel value." If the input pixel value is smaller than the threshold value in the large dot matrix 811, the input pixel value is compared with a threshold value in the medium dot matrix 812. If the input pixel value is greater than the threshold value in the medium dot matrix 812, a halftone pixel value of "2" is assigned to the above pixel position. If the input pixel value is smaller than the threshold value in the medium dot matrix 812, the input pixel value is compared with a threshold value in the small dot matrix 813. If the input pixel value is greater than the threshold value in the small dot matrix 813, a halftone pixel value of "1" is assigned to the above pixel position, and if the input pixel value is less than or equal to the threshold value, a halftone pixel value of "0" is assigned to the above pixel position.

Figure 7:
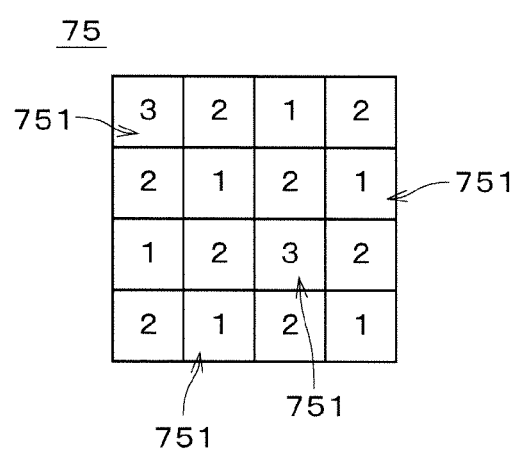
FIG. 7 illustrates a simplified halftone image region.

FIG. 7 is a simplified conceptual diagram of a halftone image region 75 where a halftone image is to be generated. In FIG. 7, the halftone image region 75 is illustrated as a square region in which four pixel positions 751 are arranged in rows and columns. Although the halftone image region 75 in FIG. 7 includes 16 pixel positions 751, in actuality, the halftone image region 75 includes a larger number of pixel positions. In FIG. 7, the numerical value assigned to each pixel position 751 indicates a halftone pixel value in the first halftone image data.

As will be described later, a large-sized fine droplet of ink is ejected and a large dot is formed at a pixel position 751 (i.e., a dot recording position on the recording medium 9) having a halftone pixel value of "3" in the halftone image region 75. Also, a medium-sized fine droplet of ink is ejected and a medium dot is formed at a pixel position 751 having a halftone pixel value of "2," and a small-sized fine droplet of ink is ejected and a small dot is formed at a pixel position 751 having a halftone pixel value of "1." No dot is formed at a pixel position 751 having a halftone pixel value of "0." In other words, the dot size at that pixel position 751 is the zero size.

As described above, the first halftone image data generated by the first halftone image data generation part 425 in step S12 is single-color halftone image data regarding black that indicates the sizes of a plurality of dots that are respectively to be formed at a plurality of pixel positions 751 in the halftone image region 75. In other words, the first halftone image data generation part 425 is a single-color halftone image data generation part that generates single-color halftone image data regarding black. When the size of a black dot is referred to as a "first dot size," the first dot size is one of the large size that is a largest size, the medium and small sizes that are intermediate sizes smaller than the largest size, and the zero size.

When step S12 has ended, the second halftone image data generation part 426 illustrated in FIG. 3 compares the pixel value (in the present embodiment, 255) of each pixel in the cyan tone image, which is the second color component image, with the threshold values in the matrix set for cyan with reference to the first halftone image data. Through this, halftone processing is performed on the cyan tone image (i.e., the cyan tone image is halftoned), and second halftone image data is generated (step S13). The second halftone image data is single-color halftone image data regarding cyan that indicates the sizes of a plurality of dots that are respectively to be formed at the plurality of pixel positions in the halftone image region. When the size of a cyan dot is referred to a "second dot size," the second dot size is one of the large size, which is the largest size, the medium and small sizes that are intermediate sizes smaller than the largest size, and the zero size, similarly to the first dot size.

Figure 8:
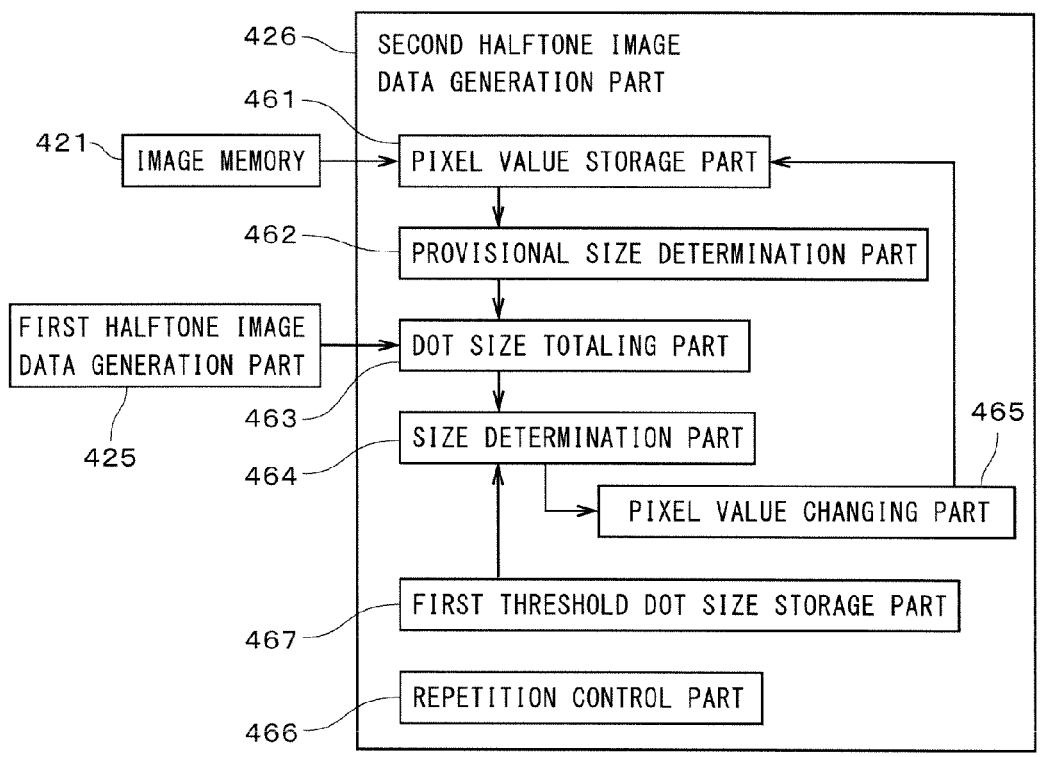
FIG. 8 is a block diagram illustrating functions of a second halftone image data generation part.
Figure 9A:
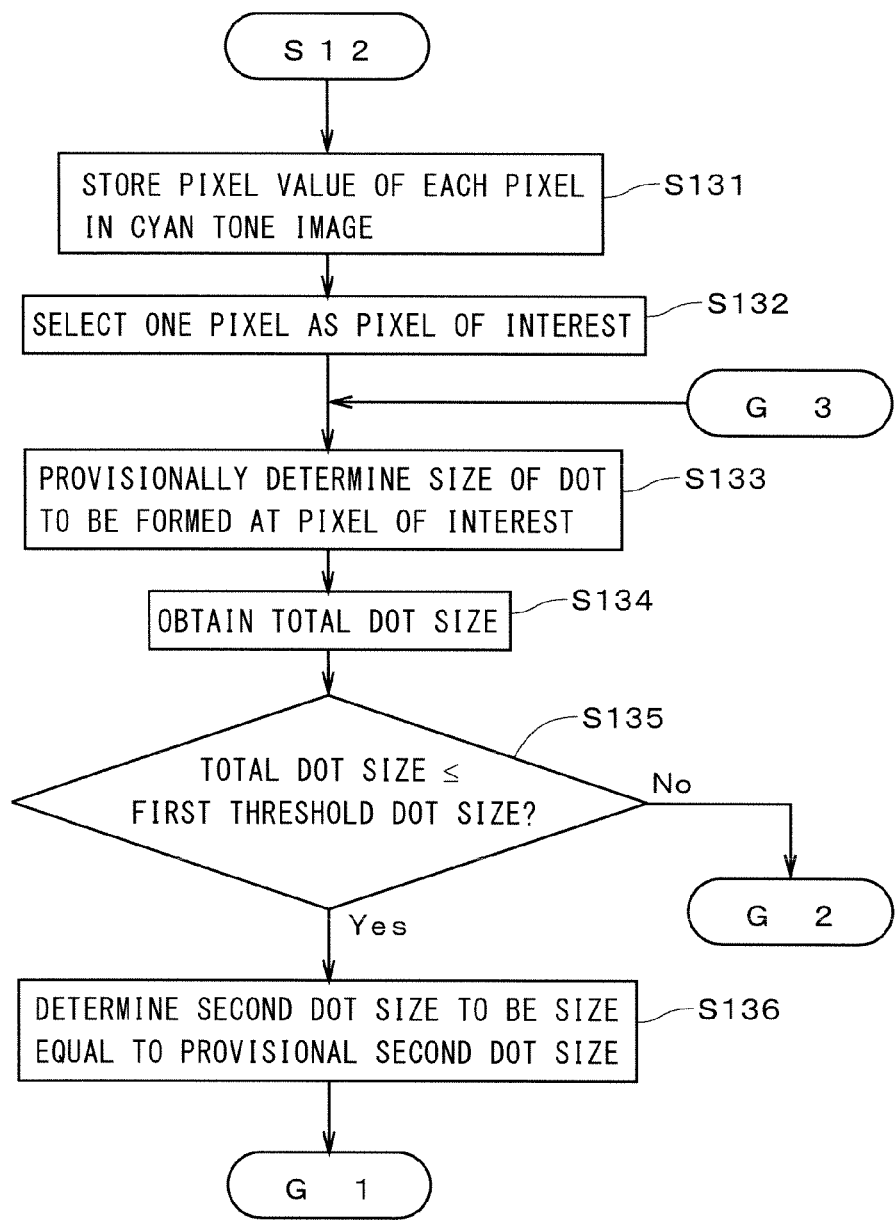
FIGS. 9A and 9B illustrate part of the procedure of image recording.
Figure 9B:
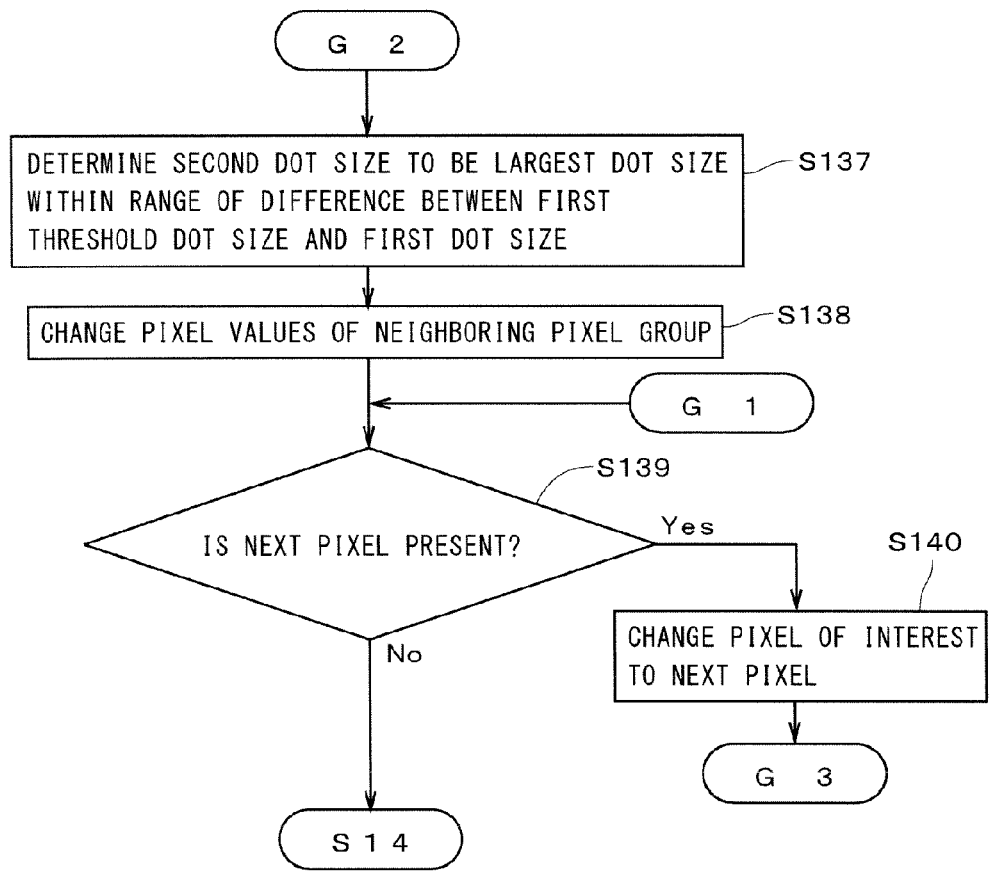

FIG. 8 is a block diagram illustrating functions of the second halftone image data generation part 426. FIGS. 9A and 9B illustrate a detailed procedure of step S13. As illustrated in FIG. 8, the second halftone image data generation part 426 includes a pixel value storage part 461, a provisional size determination part 462, a dot size totaling part 463, a size determination part 464, a pixel value changing part 465, a repetition control part 466, and a first threshold dot size storage part 467.

The first threshold dot size storage part 467 stores a first threshold dot size that is used to generate the second halftone image data. The first threshold dot size indicates an upper-limit value for the sum of the sizes of dots of black and cyan inks that are to be recorded on a single pixel. In the image recording apparatus 1, the first threshold dot size is a size corresponding to the sum of a large dot and a small dot. The amount of ink corresponding to the first threshold dot size is 12 pl, and the halftone pixel value corresponding thereto is "4." The first threshold dot size is also a size that corresponds to the sum of a medium dot and a medium dot.

The second halftone image data generation part 426 reads the cyan tone image from the image memory 421 and stores the pixel value of each pixel in the pixel value storage part 461 (step S131). Then, one of the pixels in the cyan tone image is selected as a pixel of interest (step S132). In the present embodiment, a pixel corresponding to the pixel position 751 at the upper left corner of the halftone image region 75 illustrated in FIG. 7 is selected as a pixel of interest. Next, the provisional size determination part 462 performs halftone processing similar to that described above on the pixel of interest and provisionally determines the size of a cyan dot that is to be formed at a pixel position 751 corresponding to the pixel of interest (hereinafter, "target pixel position 751") in the halftone image region 75 (step S133).

Specifically, the pixel value of the pixel of interest is compared with a threshold value of the large dot matrix 811 for cyan at the target pixel position 751 in the halftone image region 75. If the pixel value of the pixel of interest is greater than the threshold value, a halftone pixel value of "3" is provisionally assigned to the target pixel position 751. In other words, the size of a cyan dot to be formed at the target pixel position 751 is provisionally determined to be the large size. If the pixel value of the pixel of interest is smaller than the threshold value in the large dot matrix 811, the pixel value of the pixel of interest is compared with a threshold value in the medium dot matrix 812 for cyan. If the pixel value of the pixel of interest is greater than the threshold value in the medium dot matrix 812, a halftone pixel value of "2" is provisionally assigned to the target pixel position 751, and the size of a cyan dot to be formed at the target pixel position 751 is provisionally determined to be the medium size.

If the pixel value of the pixel of interest is smaller than the threshold value in the medium dot matrix 812, the pixel value of the pixel of interest is compared with a threshold value in the small dot matrix 813 for cyan. If the pixel value of the pixel of interest is greater than the threshold value in the small dot matrix 813, a halftone pixel value of "1" is provisionally assigned to the target pixel position 751 and the size of a cyan dot to be formed at the target pixel position 751 is provisionally determined to be the small size. If the pixel value of the pixel of interest is less than or equal to the threshold value in the small dot matrix 813, a halftone pixel value of "0" is provisionally assigned to the target pixel position 751 and the size of a cyan dot to be formed at the target pixel position 751 is provisionally determined to be the zero size.

When the provisional determination of the dot size has ended, the dot size totaling part 463 acquires the first dot size, which is the size of a black dot to be formed at the target pixel position 751 in the halftone image region 75, from the first halftone image data generation part 425. As illustrated in FIG. 7, the halftone pixel value for black at the target pixel position 751 is "3," and the first dot size is the large size. The dot size totaling part 463 then obtains a total dot size that is the sum of the first dot size and a provisional second dot size at the target pixel position 751, the provisional second dot size being the size of a cyan dot that is provisionally determined in step S133 (step S134).

Then, the size determination part 464 compares the total dot size with the first threshold dot size that is stored in advance in the first threshold dot size storage part 467 (step S135). Specifically, the amount of ink (12 pl) corresponding to the first threshold dot size and the amount of ink corresponding to the total dot size are compared. If the amount of ink corresponding to the total dot size is less than or equal to 12 pl, it is determined that the total dot size is less than or equal to the first threshold dot size. If the amount of ink corresponding to the total dot size is greater than 12 pl, it is determined that the total dot size is greater than the first threshold dot size.

The comparison between the total dot size and the first threshold dot size may be made by comparing the halftone pixel value (i.e., 4) corresponding to the first threshold dot size and a halftone pixel value corresponding to the total dot size (i.e., the sum of the halftone pixel values for black and cyan at the target pixel position 751). In this case, if the halftone pixel value corresponding to the total dot size is "4" or less, it is determined that the total dot size is less than or equal to the first threshold dot size. If the halftone pixel value corresponding to the total dot size is greater than "4," it is determined that the total dot size is greater than the first threshold dot size.

If the provisional second dot size is a zero size (the corresponding amount of ink is 0 pl), the total dot size is a size corresponding to the sum of the large size and the zero size, and the amount of ink corresponding to the total dot size is 9 pl. It is thus determined that the total dot size is less than or equal to the first threshold dot size, and the size determination part 464 determines that a second dot size that is the size of a cyan dot to be formed at the target pixel position 751 is a size equal to the provisional second dot size, the zero size (step S136). In this case, a value of "0" is assigned as a halftone pixel value for cyan to the target pixel position 751.

If the provisional second dot size is the small size (the corresponding amount of ink is 3 pl), the total dot size is a size corresponding to the sum of the large size and the small size, and the amount of ink corresponding to the total dot size is 12 pl. It is thus determined that the total dot size is less than or equal to the first threshold dot size as described above, and the size determination part 464 determines that the second dot size is the small size, which is equal to the provisional second dot size (step S136). Thus, a value of "1" is assigned as a halftone pixel value for cyan to the target pixel position 751.

If the provisional second dot size is the medium size (the corresponding amount of ink is 6 pl), the total dot size is a size corresponding to the sum of the large size and the medium size, and the amount of ink corresponding to the total dot size is 15 pl. It is thus determined that the total dot size is greater than the first threshold dot size. Then, the size determination part 464 determines that the second dot size is a largest dot size within the range of a difference between the first threshold dot size and the first dot size, i.e., a small size (step S137). In terms of the amount of ink corresponding to the dot size, it is determined that the second dot size is the small size, which is the largest dot size within the range of the difference (3 pl) between the amount of ink (12 pl) corresponding to the first threshold dot size and the amount of ink (9 pl) corresponding to the first dot size. Thus, a value of "1" is assigned as a halftone pixel value for cyan to the target pixel position 751.

If the provisional second dot size is the large size (the corresponding amount of ink is 9 pl), the total dot size is a size corresponding to the sum of the large size and the large size, and the amount of ink corresponding to the total dot size is 18 pl. It is thus determined that the total dot size is greater than the first threshold dot size as in the above case, and the size determination part 464 determines that the second dot size is the small size, which is the largest dot size within the range of the difference between the first threshold dot size and the first dot size (step S137). Thus, a value of "1" is assigned as a halftone pixel value for cyan to the target pixel position 751.

When it has been determined in step S135 that the total dot size is greater than the first threshold dot size, step S137 is followed by a step in which the pixel value changing part 465 accesses the cyan tone image stored in the pixel value storage part 461. The pixel value changing part 465 then changes the pixel values of pixels at one or more pixel positions 751 that are located around the pixel of interest in the cyan tone image and at which the second dot size has not yet been determined (hereinafter, these pixels are referred to as a "neighboring pixel group"), on the basis of the pixel value of the pixel of interest and the difference between the provisional second dot size and the second dot size at the target pixel position 751 (step S138).

Figure 10:
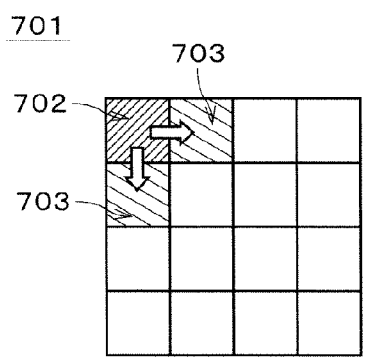
FIG. 10 illustrates how pixel values in a neighboring pixel group are changed.

FIG. 10 illustrates how pixel values of the neighboring pixel group are changed. In FIG. 10, a pixel of interest 702 in a tone image 701 is hatched with diagonal parallel lines, and pixels 703 (hereinafter, neighboring pixels 703) included in the neighboring pixel group are hatched with diagonal parallel lines different from those of the pixel of interest 702. The neighboring pixels 703 included in the neighboring pixel group are pixels having a predetermined positional relationship with the pixel of interest 702. In the present embodiment, the neighboring pixel group includes two neighboring pixels 703 that are adjacent to the right and bottom sides of the pixel of interest 702. In step S138, the pixel values of the neighboring pixel group are changed by dividing the difference between the provisional second dot size and the second dot size by the provisional second dot size, multiplying the pixel value of the pixel of interest 702 by a value obtained by the division, and then equally distributing and adding the multiplication result to the neighboring pixels 703 included in the neighboring pixel group.

For example, when the provisional second dot size is the medium size, the second dot size determined in step S137 is the small size, and the amount of ink corresponding to the difference between the provisional second dot size and the second dot size is 6−3=3 pl. The pixel value of the pixel of interest is 204, as described above. Thus, as indicated by hollow arrows in FIG. 10, a pixel value of 204×(6−3)/6=102 is equally distributed to the two neighboring pixels 703 included in the neighboring pixel group. In other words, a pixel value of 51 is added to each of the neighboring pixels 703, and consequently the neighboring pixels 703 each have a pixel value of 255.

When the provisional second dot size is the large size, the second dot size determined in step S137 is a small size, and the amount of ink corresponding to the difference between the provisional second dot size and the second dot size is 9−3=6 pl. Thus, a pixel value of 204×(9−3)/9=136 is equally distributed to the two neighboring pixels 703 included in the neighboring pixel group. In other words, a pixel value of 68 is added to each of the neighboring pixels 703, and consequently the neighboring pixels 703 each have a pixel value of 272. In step S138, if the pixel values of the neighboring pixels 703 become greater than 255 by the addition of the pixel value, the pixel values of the neighboring pixels 703 are changed to a pixel value of 255.

Figure 11:
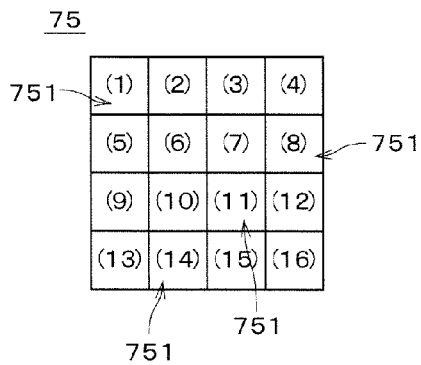
FIG. 11 illustrates a processing order.

When the second dot size has been determined and the pixel values of the neighboring pixel group have been changed as necessary, the pixel of interest is changed to the next pixel in accordance with a predetermined processing order (described later) of the pixel positions 751 (steps S139 and S140). The procedure then returns to step S133, and the processing of steps S133 to S138 is performed on the new pixel of interest. FIG. 11 illustrates the above processing order. In the image recording apparatus 1, the processing of steps S133 to S138 is performed in descending order of numbers in parentheses at the pixel positions 751 in FIG. 11. As illustrated in FIG. 11, the processing of steps S133 to S138 is performed in sequential order from a pixel position 751 at one end to a pixel position 751 at the other end in rows of the pixel positions 751 in the halftone image region 75. Alternatively, the processing of steps S133 to S138 may be performed in sequential order from a pixel position 751 at one end to a pixel position 751 at the other end in columns of the pixel positions 751 in the halftone image region 75.

In the image recording apparatus 1, steps S133 to S140 are repeated under the control of the repetition control part 466 in FIG. 8 until the second dot sizes are determined for the pixel positions 751 corresponding to all the pixels in the cyan tone image. Through this, the second halftone image data is generated, which is single-color halftone image data used to record a cyan image. The second halftone image data generation part 426 is a single-color halftone image data generation part that generates single-color halftone image data regarding cyan.

While the above description takes the example of the case in which the first dot size at the target pixel position 751 is the large size, the other cases will be described below. For example, when the first dot size at the target pixel position 751 is the medium size and if the provisional second dot size is one of the zero size, the small size, and the medium size, the total dot size is less than or equal to the first threshold dot size, and it is determined that the second dot size is a size equal to the provisional second dot size. If the provisional second dot size is the large size, it is determined that the second dot size is the medium size, which is the largest dot size within the range of the difference between the first threshold dot size and the first dot size. When the first dot size at the target pixel position 751 is either the small size or the zero size, it is determined that the second dot size is always a size equal to the provisional second dot size.

When the generation of the second halftone image data has ended, the third halftone image data generation part 427 in FIG. 3 compares the pixel value (in the present embodiment, 128) of each pixel in the magenta tone image, which is a third color component image, with the threshold values in the matrix set for magenta with reference to the first halftone image data and the second halftone image data. Through this, halftone processing is performed on the magenta tone image (i.e., the magenta tone image is halftoned), and third halftone image data is generated (step S14). The third halftone image data is single-color halftone image data regarding magenta, which is the above-described target color component, the data indicating the sizes of a plurality of magenta dots that are respectively to be formed at the plurality of pixel positions in the halftone image region. When the size of magenta dots is referred to as a "third dot size," the third dot size is one of the large size, which is the largest size, the medium and small sizes that are intermediate sizes smaller than the largest size, and the zero size, similarly to the first and second dot sizes.

Figure 12:
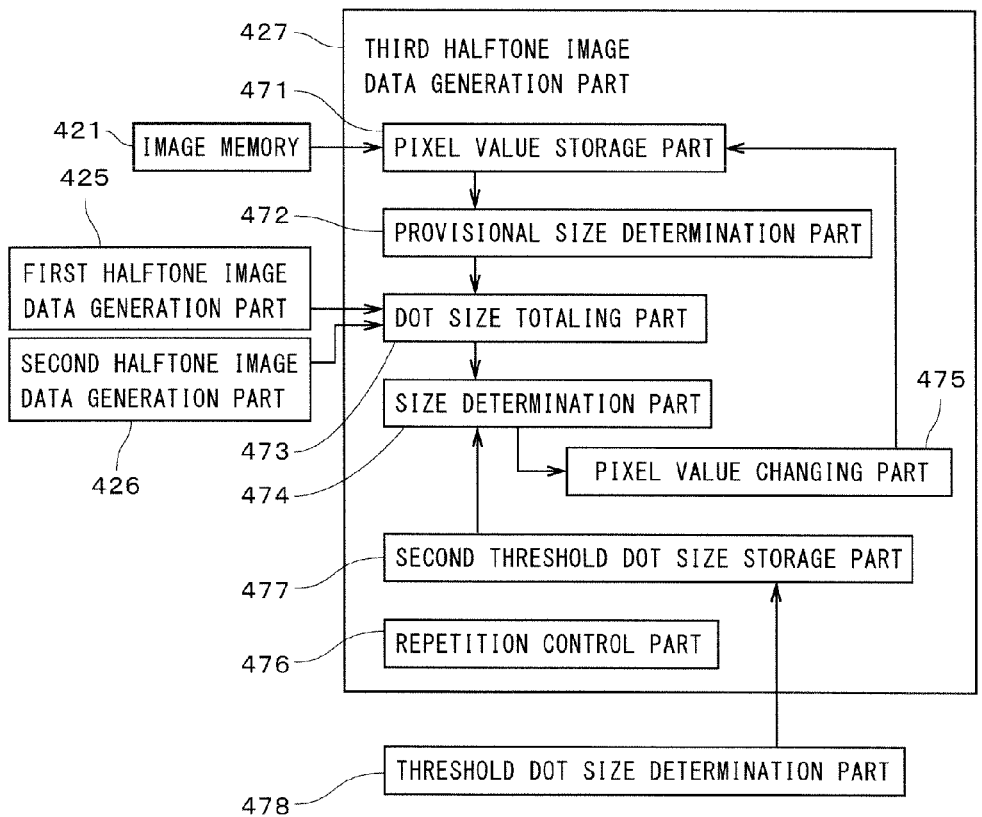
FIG. 12 is a block diagram illustrating functions of a third halftone image data generation part.
Figure 13A:
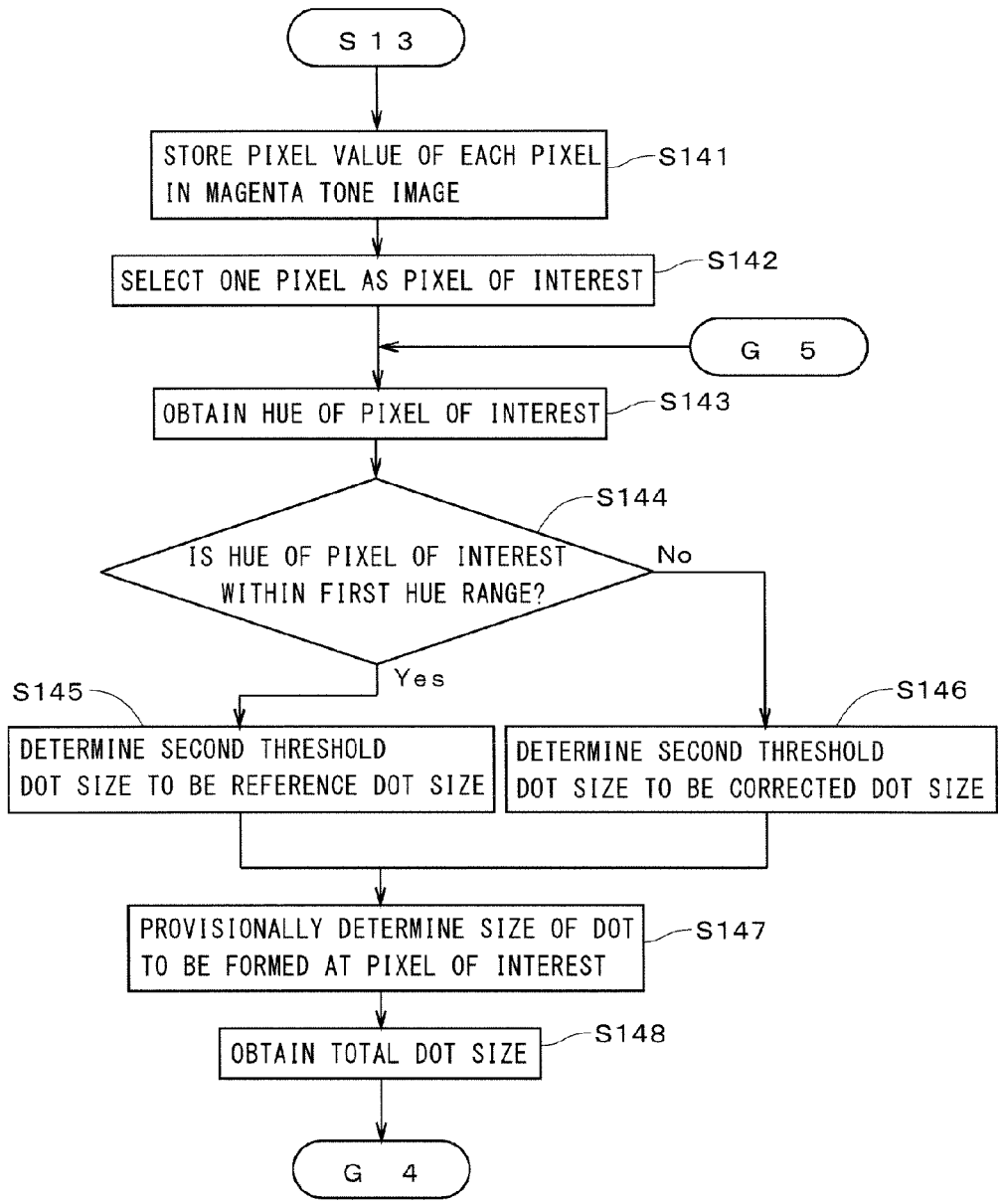
FIGS. 13A and 13B and FIGS. 14 to 17 illustrate part of the procedure of image recording.
Figure 13B:
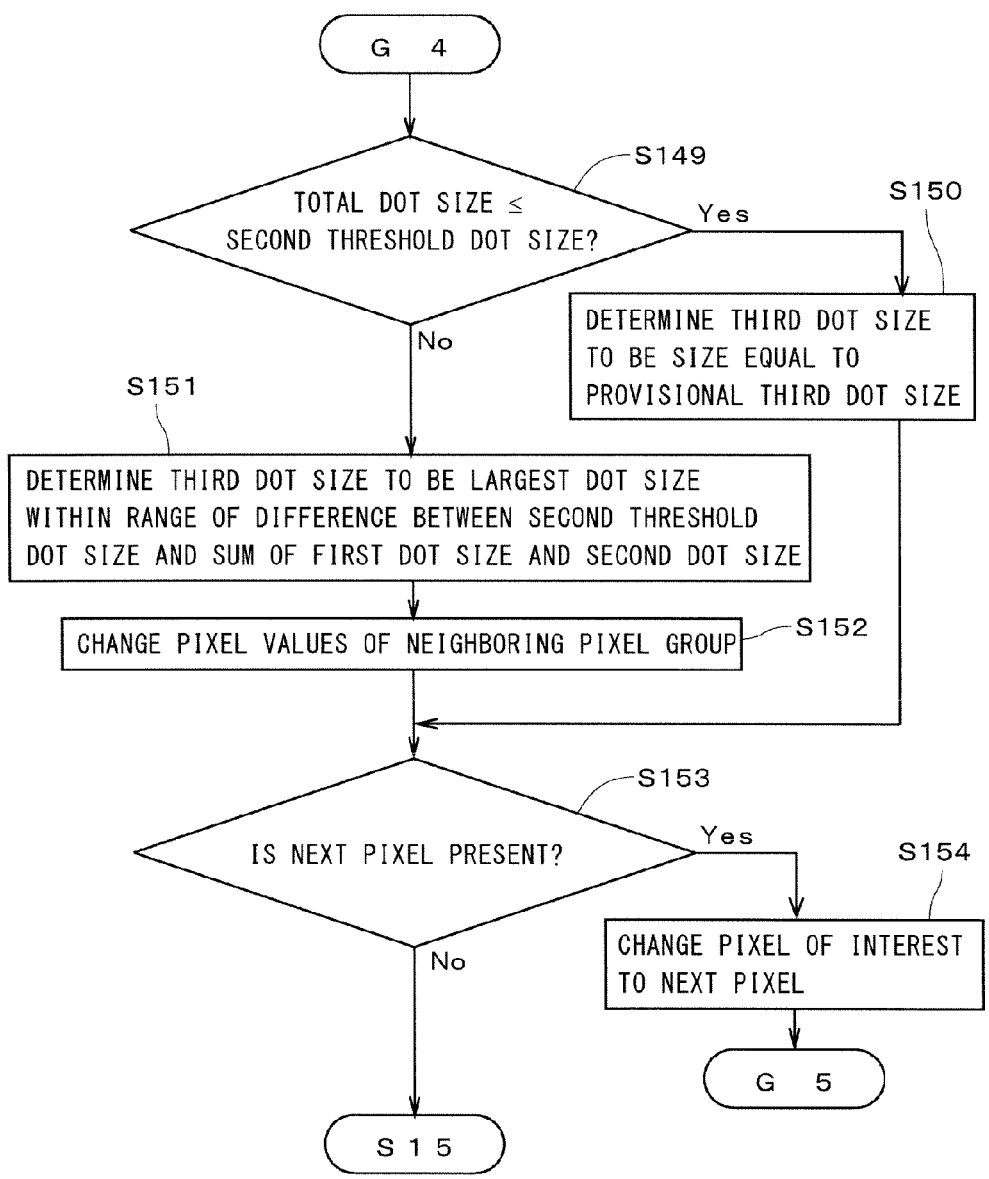

FIG. 12 is a block diagram showing functions of the third halftone image data generation part 427. FIGS. 13A and 13B illustrate a detailed procedure of step S14. As illustrated in FIG. 12, the third halftone image data generation part 427 includes a pixel value storage part 471, a provisional size determination part 472, a dot size totaling part 473, a size determination part 474, a pixel value changing part 475, a repetition control part 476, and a second threshold dot size storage part 477.

The second threshold dot size storage part 477 stores a second threshold dot size that is used to generate the third halftone image data. The second threshold dot size indicates an upper-limit value for the sum of the sizes of dots of black, cyan, and magenta inks that are to be recorded on a single pixel. The second threshold dot size is another threshold dot size different from the aforementioned first threshold dot size and is greater than or equal to the first threshold dot size. The second threshold dot size for magenta is determined for each of a plurality of pixel positions in the halftone image region by a threshold dot size determination part 478 as will described later.

The third halftone image data generation part 427 reads the magenta tone image from the image memory 421 and stores the pixel value of each pixel in the pixel value storage part 471 (step S141). Then, as in step S132, one of the pixels in the magenta tone image is selected as a pixel of interest (step S142). In the present embodiment, a pixel corresponding to a pixel position 751 at the upper left corner of the halftone image region 75 illustrated in FIG. 7 is selected as a pixel of interest.

Next, the threshold dot size determination part 478 obtains the hue of the pixel of interest in the color image that has undergone gray-component replacement (step S143). Since the color image is a tint image of the first hue as described above, the hue of the pixel of interest has a chromaticity of $a^*>0$ and $-100 \leq b^* \leq -50$.

If the hue of the pixel of interest is within the range of the first hue (hereinafter, referred to as a "first hue range"), the threshold dot size determination part 478 determines that the second threshold dot size at the target pixel position 751 corresponding to the pixel of interest is a predetermined reference threshold dot size (steps S144 and S145). On the other hand, if the hue of the pixel of interest is within the range of the second hue (hereinafter, referred to as a "second hue range") in which magenta serving as the target color component is more prominent (i.e., more reddish) than in the first hue range, it is determined that the second threshold dot size at the target pixel position 751 corresponding to the pixel of interest is a predetermined corrected threshold dot size (steps S144 and S146). The first hue range is the entire hue range other than the second hue range. The corrected threshold dot size is greater than the reference threshold dot size. The second threshold dot size determined by the threshold dot size determination part 478 is stored in the second threshold dot size storage part 477.

In the image recording apparatus 1, the above-described first hue range is a range in which the chromaticity satisfies at least one of $a^* \leq 0$, $b^* \leq -50$, and $50 \geq b^*$. In this case, the second hue range is a range in which the chromaticity satisfies $a^*>0$ and $-50<b^*<50$. As described above, since the hue of the pixel of interest has a chromaticity of $a>0$ and $-100 \leq b^* \leq -50$, the hue of the pixel of interest is within the first hue range. Accordingly, it is determined that the second threshold dot size at the target pixel position 751 is the reference threshold dot size.

In the image recording apparatus 1, the reference threshold dot size is a size corresponding to the sum of a large dot, a medium dot, and a small dot. The amount of ink corresponding to the reference threshold dot size is 18 pl, and the halftone pixel value corresponding thereto is "6." The reference threshold dot size is also a size corresponding to the sum of three medium dots, or a size corresponding to the sum of two large dots and a dot zero. The corrected threshold dot size is a size corresponding to the sum of one large dot and two medium dots. The amount of ink corresponding to the corrected threshold dot size is 21 pl, and the halftone pixel value corresponding thereto is "7." The corrected threshold dot size is also a size corresponding to the sum of two large dots and one small dot.

Next, the provisional size determination part 472 performs halftone processing similar to that in step S133 on the pixel of interest in the magenta image and provisionally determines the size of a magenta dot that is to be formed at the target pixel position 751 corresponding to the pixel of interest in the halftone image region 75 (step S147).

Specifically, the pixel value of the pixel of interest is compared with a threshold value in the large dot matrix 811 for magenta at the target pixel position 751 in the halftone image region 75. If the pixel value of the pixel of interest is greater than the threshold value, a halftone pixel value of "3" is provisionally assigned to the target pixel position 751. In other words, it is provisionally determined that the size of a magenta dot to be formed at the target pixel position 751 is the large size. If the pixel value of the pixel of interest is smaller than the threshold value in the large dot matrix 811, the pixel value of the pixel of interest is compared with a threshold value in the medium dot matrix 812 for magenta. If the pixel value of the pixel of interest is greater than the threshold value in the medium dot matrix 812, a halftone pixel value of "2" is provisionally assigned to the target pixel position 751, and it is provisionally determined that the size of a magenta dot to be formed at the target pixel position 751 is the medium size.

If the pixel value of the pixel of interest is smaller than the threshold value in the medium dot matrix 812, the pixel value of the pixel of interest is compared with a threshold value in the small dot matrix 813 for magenta. If the pixel value of the pixel of interest is greater than the threshold value in the small dot matrix 813, a halftone pixel value of "1" is provisionally assigned to the target pixel position 751, and it is provisionally determined that the size of a magenta dot to be formed at the target pixel position 751 is the small size. If the pixel value of the pixel of interest is less than or equal to the threshold value in the small dot matrix 813, a halftone pixel value of "0" is provisionally assigned to the target pixel position 751, and it is provisionally determined that the size of a magenta dot to be formed at the target pixel position 751 is the zero size.

When the provisional determination of the dot size has ended, the dot size totaling part 473 acquires the first dot size and the second dot size respectively from the first halftone image data generation part 425 and the second halftone image data generation part 426, the first dot size being the size of a black dot to be formed at the target pixel position 751 in the halftone image region 75, and the second dot size being the size of a cyan dot to be formed at the target pixel position 751. As illustrated in FIG. 7, the halftone pixel value for black at the target pixel position 751 is "3," and the first dot size is the large size. The second dot size is, as described above, either the small size or the zero size, and the following description is given on the assumption that the second dot size is the small size. In this case, the amount of ink corresponding to the sum of the first dot size and the second dot size is 12 pl, and the halftone pixel value corresponding thereto is "4."

The dot size totaling part 473 obtains a total dot size that is the sum of a provisional third dot size, which is the size of a magenta dot provisionally determined in step S147, and the sum (hereinafter, referred to as a "previous total dot size") of the first dot size and the second dot size (step S148). The total dot size obtained in step S148 is another total dot size different from that obtained in step S134. In the following description, the total dot size obtained in step S134 is referred to as a "first total dot size," and the total dot size obtained in step S148 is referred to as a "second total dot size."

Then, the size determination part 474 compares the second total dot size at the target pixel position 751 with the second threshold dot size (i.e., the reference threshold dot size) at the target pixel position 751, which is stored in the second threshold dot size storage part 477 (step S149). Specifically, the amount of ink (18 pl) corresponding to the second threshold dot size and the amount of ink corresponding to the second total dot size are compared. If the amount of ink corresponding to the second total dot size is 18 pl or less, it is determined that the second total dot size is less than or equal to the second threshold dot size. If the amount of ink corresponding to the second total dot size is greater than 18 pl, it is determined that the second total dot size is greater than the second threshold dot size.

The comparison between the second total dot size and the second threshold dot size may be made by comparing the halftone pixel value (i.e., 6) corresponding to the second threshold dot size and a halftone pixel value corresponding to the second total dot size (i.e., the sum of the halftone pixel values for black, cyan, and magenta at the target pixel position 751). In this case, if the halftone pixel value corresponding to the second total dot size is "6" or less, it is determined that the second total dot size is less than or equal to the second threshold dot size, and if the halftone pixel value corresponding to the second total dot size is greater than "6," it is determined that the second total dot size is greater than the second threshold dot size.

When the provisional third dot size is the zero size (the corresponding amount of ink is 0 pl), the second total dot size is a size corresponding to the sum of the large size, which is the first dot size, the small size, which is the second dot size, and the zero size, which is the provisional third dot size. The amount of ink corresponding to the second total dot size is 12 pl. It is thus determined that the second total dot size is less than or equal to the second threshold dot size, and the size determination part 474 determines that a third dot size that is the size of a magenta dot to be formed at the target pixel position 751 is a size equal to the provisional third dot size, i.e., the zero size (step S150). Thus, a value of "0" is assigned as a halftone pixel value for magenta to the target pixel position 751.

When the provisional third dot size is the small size (the corresponding amount of ink is 3 pl), the second total dot size is a size corresponding to the sum of the large size, the small size, and the small size, and the amount of ink corresponding to the second total dot size is 15 pl. It is thus determined that the second total dot size is less than or equal to the second threshold dot size as described above, and the size determination part 474 determines that the third dot size is a size equal to the provisional third dot size, i.e., the small size (step S150). Thus, a value of "1" is assigned as a halftone pixel value for magenta to the target pixel position 751.

When the provisional third dot size is the medium size (the corresponding amount of ink is 6 pl), the second total dot size is a size corresponding to the sum of the large size, the small size, and the medium size, and the amount of ink corresponding to the second total dot size is 18 pl. It is thus determined that the second total dot size is less than or equal to the second threshold dot size as described above, and the size determination part 474 determines that the third dot size is a size equal to the provisional third dot size, i.e., the medium size (step S150). Thus, a value of "2" is assigned as a halftone pixel value to the target pixel position 751.

When the provisional third dot size is the large size, the second total dot size is a size corresponding to the sum of the large size, the small size, and the large size, and the amount of ink corresponding to the second total dot size is 21 pl. It is thus determined that the second total dot size is greater than the second threshold dot size. Thus, the size determination part 474 determines that the third dot size is a largest dot size within the range of a difference between the second threshold dot size and the sum of the first dot size and the second dot size, i.e., the medium size (step S151). In terms of the amount of ink corresponding to the dot size, it is determined that the third dot size is the medium size, which is the largest dot size within the range of the difference (6 pl) between the amount of ink corresponding to the second threshold dot size (18 pl) and the amount of ink corresponding to the sum of the first dot size and the second dot size (12 pl). Thus, a value of "2" is assigned as a halftone pixel value for magenta to the target pixel position 751.

When it is determined in step S149 that the second total dot size is greater than the second threshold dot size, step S151 is followed by a step in which the pixel value changing part 475 accesses the magenta tone image stored in the pixel value storage part 471. The pixel value changing part 475 then changes the pixel values of the neighboring pixel group that includes pixels at one or more pixel positions 751 that are located around the pixel of interest in the magenta tone image and at which the third dot size has not yet been determined, on the basis of the pixel value of the pixel of interest and the difference between the provisional third dot size and the third dot size at the target pixel position 751 (step S152).

In step S152, similarly to step S138, the pixel values of the neighboring pixel group are changed by dividing the difference between the provisional third dot size and the third dot size by the provisional third dot size, multiplying the pixel value of the pixel of interest 702 (see FIG. 10) by a value obtained by the division, and then equally distributing and adding the multiplication result to the neighboring pixels 703 included in the neighboring pixel group. Specifically, when the provisional third dot size is the large size, the third dot size determined in step S151 is the medium size, and the amount of ink corresponding to the difference between the provisional third dot size and the third dot size is 9−6=3 pl. The pixel value of the pixel of interest is 128 as described above. Thus, a pixel value of 128×(9−6)/9≈42 is equally distributed to the two neighboring pixels 703 (see FIG. 10) included in the neighboring pixel group. In other words, a pixel value of 21 is added to each of the neighboring pixels 703, and consequently the pixel values of the neighboring pixels 703 are changed to a pixel value of 149.

When the third dot size has been determined and the pixel values of the neighboring pixel group have been changed as necessary, the pixel of interest is changed to the next pixel in accordance with a predetermined processing order (see FIG. 11) of the pixel positions 751 (steps S154 and S154). The procedure then returns to step S143 and the processing of steps S143 to S152 is performed on the new pixel of interest. Similarly to the processing of steps S133 to S138, the processing of steps S143 to S152 is performed in sequential order from a pixel position 751 at one end to a pixel position 751 at the other end in rows of the pixel positions 751 in the halftone image region 75 illustrated in FIG. 11. Alternatively, the processing of steps S143 to S152 may be performed in sequential order from a pixel position 751 at one end to a pixel position 751 at the other end in columns of the pixel positions 751 in the halftone image region 75.

The image recording apparatus repeats steps S143 to S154 under the control of the repetition control part 476 until the third dot sizes are determined for the pixel positions 751 corresponding to all the pixels in the magenta tone image. Through this, the third halftone image data is generated, which is single-color halftone image data used to record an image of magenta, which is the target color component. The third halftone image data generation part 427 is a target color component halftone image data generation part that generates single-color halftone image data regarding the target color component.

While the above description takes the example of the case in which the first dot size and the second dot size at the target pixel position 751 are respectively the large size and the small size, other cases will be described below. For example, when the first dot size and the second dot size at the target pixel position 751 are respectively the small size and the large size or they are both the medium size and if the provisional third dot is one of the zero size, the small size, and the medium size, it is determined as described above that the third dot size is a size equal to the provisional third dot size. On the other hand, if the provisional third dot size is the large size, it is determined that the third dot size is the medium size, which is the largest dot size within the range of the difference between the second threshold dot size and the previous total dot size (i.e., the sum of the first dot size and the second dot size).

When one of the first dot size and the second dot size at the target pixel position 751 is the large size and the other is the zero size, the second total dot size is always less than or equal to the second threshold dot size, and accordingly it is always determined that the third dot size is a size equal to the provisional third dot size. For example, if the provisional third dot size is the large size, it is always determined that the third dot size is the large size. The same applies to the case where one of the first dot size and the second dot size is the medium size and the other is the small size, the case where the first dot size and the second dot size are both the small size or the zero size, and the case where one of the first dot size and the second dot size is the small size and the other is the zero size.

While the above description takes the example of the case where the amount of ink corresponding to the first threshold dot size is 12 pl and the halftone pixel value corresponding thereto is "4," the case of a different first threshold dot size will be described below. First, a case is described in which the amount of ink corresponding to the first threshold dot size is 15 pl and the halftone pixel value corresponding thereto is "5." When one of the first dot size and the second dot size at the target pixel position 751 is the large size (the corresponding amount of ink is 9 pl) and the other is the medium size (the corresponding amount of ink is 6 pl) and if the provisional third dot size is either the zero size (the corresponding amount of ink is 0 pl) or the small size (the corresponding amount of ink is 3 pl), it is determined that the third dot size is a size equal to the provisional third dot size. On the other hand, if the provisional third dot size is either the medium size or the large size, it is determined that the third dot size is the small size, which is the largest dot size within the range of the difference between the second threshold dot size (the corresponding amount of ink is 18 pl) and the previous total dot size (the corresponding amount of ink is 15 pl).

Next, a case is described in which the amount of ink corresponding to the first threshold dot size is 18 pl, and the halftone pixel value corresponding thereto is "6." When the first dot size and the second dot size at the target pixel position 751 are both the large size and if the provisional third dot size is one of the large size, the medium size, and the small size, the second total dot size is always greater than the second threshold dot size, and therefore it is always determined that the third dot size is the zero size.

When the generation of the third halftone image data has ended, the fourth halftone image data generation part 428 in FIG. 3 compares the pixel value of each pixel in the yellow tone image, which is the fourth color component image, with the threshold values in the matrix set for yellow. Through this, halftone processing is performed on the yellow tone image (i.e., the yellow tone image is halftoned) in the same manner as the halftone processing performed in step S12 on the black tone image. Consequently, fourth halftone image data that indicates the sizes of a plurality of yellow dots that are respectively to be formed at the plurality of pixel positions in the halftone image region is generated (step S15). In the present embodiment, the dot sizes at all the pixel positions 751 in the halftone image region 75 are the zero size because the above description is given on the assumption that the tone value of the yellow tone image generated in step S11 is 0.

As described above, the image recording apparatus 1 performs halftone processing on a multi-tone color image to generate halftone image data, which is a set of a plurality of pieces of single-color halftone image data that correspond respectively to the images of a plurality of color components of the color image. In actuality, when halftone image data for a portion to be first printed in the above color image has been generated and prepared, the movement control part 412 of the output control part 41 controls the movement mechanism 2 to start moving the recording medium 9 in the movement direction (step S16). In synchronization with the movement of the recording medium 9, the ejection control part 411 controls the head 31 for ejecting black ink on the basis of the first halftone image data so that a first halftone image of black dots is recorded onto the recording medium 9 (step S17).

Next, the ejection control part 411 controls the head 31 for ejecting cyan ink on the basis of the second halftone image data so that a second halftone image of cyan dots is recorded onto a region of the recording medium 9 where black dots have been recorded (hereinafter, the region is referred to as a "recorded region") (step S18). The ejection control part 411 then controls the head 31 (i.e., the target color component ejecting part) for ejecting ink of magenta, which is the target color component, on the basis of the third halftone image data so that a third halftone image of magenta dots is recorded onto the recorded region of the recording medium 9 (step S19).

Moreover, the head 31 for ejecting yellow ink is controlled on the basis of the fourth halftone image data so that a fourth halftone image of yellow dots is recorded onto the recorded region of the recording medium 9 (step S20). Note that in the present embodiment, yellow dots are not recorded on the recording media 9. The recording of a halftone image of each color component is performed in parallel with the above-described generation of halftone image data. In the generation of the halftone image data, single-color halftone image data of a plurality of color components is generated in a recording order in which the first to fourth halftone images are recorded (i.e., the order in which images of a plurality of color components, namely, black, cyan, magenta, and yellow, are recorded onto the recording medium 9).

In the image recording apparatus 1, as already described, the recording media 9 are supplied one after another from the supply part 51 and are collected by the discharge part 52 after having undergone the image recording process. When the entire halftone image has been recorded on the desired number of recording media 9, the supply of the recording media 9 is stopped and the image recording operation ends (step S21).

Next is a description of the recording of the aforementioned color image of the second hue. The recording of the color image of the second hue is performed in the same manner as the recording of the color image of the first hue described above, with the exception that step S146 is performed instead of step S145 in FIGS. 13A and 13B. First, the color component image generation part 424 performs separation processing along with gray component replacement on the color image of the second hue. This produces a black tone image having a tone value of 153 (image density of 60%), a cyan tone image having a tone value of 204 (image density of 80%), a magenta tone image having a tone value of 230 (image density of 90%), and a yellow tone image having a tone value of 0 (image density of 0%) (step S11). The second hue has reddish coloration. The color component images generated by the component image generation part 424 are stored in the image memory 421.

Next, as in the case of the color image of the first hue, the first halftone image data generation part 425 performs halftone processing on the black tone image to generate first halftone image data (step S12). Also, the second halftone image data generation part 426 performs halftone processing on the cyan tone image with reference to the first halftone image data to generate second halftone image data (step S13). In the recording of the color image of the second hue, a detailed procedure of step S13 is the same as that of steps S131 to S140 illustrated in FIGS. 9A and 9B.

Then, the third halftone image data generation part 427 performs halftone processing on the magenta tone image with reference to the first halftone image data and the second halftone image data to generate third halftone image data (step S14).

Specifically, the pixel value of each pixel in the magenta tone image is first stored in the pixel value storage part 471, and one of the pixels is selected as a pixel of interest (steps S141 and S142). Then, the threshold dot size determination part 478 obtains the hue of the pixel of interest in the above color image (step S143). Since, as described above, the color image is a tint image of the second hue, the hue of the pixel of interest has a chromaticity of a*>0 and −50<b*<0. The hue of the pixel of interest is thus within the above-described second hue range, i.e., the chromaticity is within a range that satisfies both a*>0 and −50<b*<50 (step S144). Accordingly, it is determined that the second threshold dot size at the target pixel position 751 is a corrected threshold dot size (step S146).

When the second threshold dot size has been determined, as in the case of the color image of the first hue, the provisional size determination part 472 performs halftone processing on the pixel of interest in the magenta image and provisionally determines the size of a magenta dot that is to be formed at the target pixel position 751 corresponding to the pixel of interest in the halftone image region 75 (step S147). Then, the dot size totaling part 463 obtains a previous total dot size that is the sum of the sizes of black and cyan dots that are to be formed at the target pixel position 751, and obtains a second total dot size that is the sum of the previous total dot size and a provisional third dot size (step S148).

Next, as in the case of the color image of the first hue, the size determination part 474 compares the second threshold dot size (i.e., the corrected threshold dot size) and the second total dot size at the target pixel position 751 (step S149). As described above, the amount of ink corresponding to the corrected threshold dot size is 21 pl, and the halftone pixel value corresponding thereto is "7." Thus, the amount of ink (21 pl) corresponding to the second threshold dot size and the amount of ink corresponding to the second total dot size are compared in step S149. Alternatively, the halftone pixel value (i.e., 7) corresponding to the second threshold dot size and the halftone pixel value corresponding to the second total dot size may be compared in step S149.

As described above, the previous total dot size is smaller than or equal to the first threshold dot size (the corresponding amount of ink is 12 pl). Thus, the second total dot size is smaller than or equal to the second threshold dot size (the corresponding amount of ink is 21 pl) in the case where the provisional third dot size is any of the zero size, the small size, the medium size, and the large size, i.e., where the amount of ink corresponding to the provisional third dot size is any of 0 pl, 3 pl, 6 pl, and 9 pl. It is thus determined that the third dot size is a size equal to the provisional third dot size (step S150).

When the third dot size has been determined, as in the case of the color image of the first hue, the pixel of interest is changed to the next pixel in accordance with a predetermined processing order of the pixel positions 751 (steps S153 and S154). The procedure then returns to step S143, and the processing of steps S143 to S152 is performed on the next pixel of interest. In the image recording apparatus 1, the steps S143 to S154 are repeated under the control of the repetition control part 476 until the third dot sizes are determined for the pixel positions 751 corresponding to all the pixels in the magenta tone image. Through this, the third halftone image data used to record the magenta image is generated.

In the above-described example of the color image of the second hue, it is determined that the third dot size is always a size equal to the provisional third dot size because the second threshold dot size is the corrected threshold dot size (the corresponding amount of ink is 21 pl) and the amount of ink corresponding to the first threshold dot size is 12 pl. Thus, the pixel value changing part 475 does not change the pixel values of the neighboring pixel group.

While the above description takes the example of the case where the amount of ink corresponding to the first threshold dot size is 12 pl and the halftone pixel value corresponding thereto is "4." other cases of different first threshold dot sizes will be described below. First, a case is described in which the amount of ink corresponding to the first threshold dot size is 15 pl and the halftone pixel value corresponding thereto is "5." At this time, when one of the first dot size and the second dot size at the target pixel position 751 is the large size and the other is the medium size and if the provisional third dot size is one of the zero size, the small size, and the medium size, it is determined that the third dot size is a size equal to the provisional third dot size.

On the other hand, if the provisional third dot size is the large size, it is determined that the third dot size is the medium size, which is a largest dot size within a range of difference between the second threshold dot size (the corresponding amount of ink is 21 pl) and the previous total dot size (the corresponding amount of ink is 15 pl) (step S151). Then, as in the case of the color image of the first hue, the pixel value changing part 475 changes the pixel values of the group of neighboring pixels in the magenta tone image, which are pixels at one or more pixel positions 751 that are located around the pixel of interest and at which the third dot size has not yet been determined, on the basis of the pixel value of the pixel of interest and a difference between the provisional third dot size and the third dot size at the target pixel position 751 (step S152).

Next, a case is described in which the amount of ink corresponding to the first threshold dot size is 18 pl and the halftone pixel value corresponding thereto is "6." At this time, when the first dot size and the second dot size at the target pixel position 751 are both the large size and if the provisional third dot size is either the zero size or the small size, it is determined that the third dot size is a size equal to the provisional third dot size (step S150).

On the other hand, if the provisional third dot size is either the medium size or the large size, it is determined that the third dot size is the small size, which is a largest dot size within the range of the difference between the second threshold dot size (i.e., the corrected threshold dot size) and the previous total dot size (step S151). Then, as in the case of the color image of the first hue, the pixel value changing part 475 changes the pixel values of the neighboring pixel group on the basis of the pixel value of the pixel of interest and a difference between the provisional third dot size and the third dot size at the target pixel position 751 (step S152).

When the generation of the third halftone image data has ended, as in the case described above, the fourth halftone image data generation part 428 (see FIG. 3) performs halftone processing on the yellow tone image to generate fourth halftone image data (step S15).

As described above, the image recording apparatus 1 starts moving the recording medium 9 in the movement direction in parallel with the generation of the halftone image data regarding the color image (step S16). In synchronization with the movement of the recording medium 9, the head 31 for ejecting black ink is controlled on the basis of the first halftone image data so that a first halftone image is recorded onto the recording medium 9 (step S17). Then, the head 31 for ejecting cyan ink is controlled on the basis of the second halftone image data so that a second halftone image is recorded onto the recorded region of the recording medium 9 (step S18).

Then, the head 31 for ejecting magenta ink, which is the target color component, (i.e., target color component ejecting part) is controlled on the basis of the third halftone image data so that a third halftone image is recorded onto the recorded region of the recording medium 9 (step S19). Moreover, the head 31 for ejecting yellow ink is controlled on the basis of the fourth halftone image data so that a fourth halftone image is recorded onto the recorded region of the recording medium 9 (step S20). In the present preferred embodiment, however, no yellow dots are recorded on the recording medium 9. When the entire halftone image has been recorded on the desired number of recording media 9, the image recording apparatus 1 stops the supply of the recording media 9 and ends the image recording operation (step S21).

In the case of generating the second halftone image data that indicates the sizes of cyan (second color component) dots that are respectively to be formed at a plurality of pixel positions in the halftone image region, the image recording apparatus 1 performs halftone processing on the cyan tone image with reference to the first halftone image data that indicates the sizes of black (first color component) dots, as described above. In the generation of the second halftone image data, the first halftone image data is referenced so that the previous total dot size, which is the sum of the size of a black dot (first dot size) and the size of a cyan dot (second dot size) that are to be formed at each pixel position, is smaller than or equal to a predetermined first threshold dot size. This prevents the black and cyan dots from excessively overlapping each other when the cyan dot is formed during the recording of an image on the recording medium 9. Consequently, it is possible to suppress poor color reproduction (dulling of color) and cockling (phenomenon where the surfaces of the recording media 9 become rippled) due to mixing of black and cyan inks.

When the cyan dot size that has provisionally been determined by the comparison with the matrix set is changed in order to make the previous total dot size smaller than or equal to the first threshold dot size, the pixel values of the neighboring pixel group that is located around the pixel of interest at which the dot size is changed are changed on the basis of the pixel value of the pixel of interest and the amount of change in the cyan dot size (i.e., the difference between the provisional second dot size and the second dot size). This makes it possible to correct the influence caused by the change in the cyan dot size and to accurately represent the cyan tone image on the recording media 9.

In the case of generating the third halftone image data that indicates the sizes of magenta (third color component) dots, the image recording apparatus 1 performs halftone processing on the magenta tone image with reference to the first halftone image data and the second halftone image data. In the generation of the third halftone image data, the first halftone image data and the second halftone image data are referenced so that the sum of the size of a black dot, the size of a cyan dot, and the size of a magenta dot (third dot size) that are to be formed at each pixel position is smaller than or equal to a predetermined second threshold dot size. This prevents the black, cyan, and magenta dots from excessively overlapping one another when the magenta dot is formed during the recording of an image on the recording media 9. Consequently, it is possible to suppress poor color reproduction and cockling due to mixing of black, cyan, and magenta inks.

When the magenta dot size that has provisionally been determined by the comparison with the matrix set is changed in order to make the sum of the sizes of black, cyan, and magenta dots smaller than or equal to the second threshold dot size, the pixel values of the neighboring pixel group that is located around the pixel of interest at which the dot size is changed are changed on the basis of the pixel value of the pixel of interest and the amount of change in the magenta dot size (i.e., the difference between the provisional third dot size and the third dot size). It is thus possible to correct the influence caused by the change in the magenta dot size and to accurately represent the magenta tone image on the recording media 9.

As one example of an image recording apparatus to be compared with the above-described image recording apparatus 1, assume an image recording apparatus (hereinafter, referred to as a "comparative image recording apparatus") in which the second threshold dot size is constant irrespective of the hue of the pixel of interest in the generation of the third halftone image data regarding magenta, which is the target color component (step S14). The comparative image recording apparatus can also suppress overlapping of dots of a plurality of color components at each pixel position and thereby suppress poor color reproduction and cockling due to mixing of inks, as described above. In the comparative image recording apparatus, however, the amount of ink of the target color component to be applied is restricted, similarly to the case of writing a region where the coloration of the target color component is not very strong, even in the case of writing a region where the coloration of the target color component is strong. Thus, the possibility exists of not being able to represent the desired hue due to insufficient color reproduction of the target color component, which has a lower ink density than the other color components, (i.e. insufficient reddish color reproduction) in the case of writing a region where the coloration of the target color component is strong.

In view of this, the image recording apparatus 1 illustrated in FIG. 1 obtains the hue of each pixel corresponding to each pixel position 751 in the color image and changes the second threshold dot size, which is the threshold dot size for the target color component (magenta) at each pixel position 751, according to the hue of the pixel. Specifically, if the hue of each pixel is within the above-described first hue range in which the coloration of the other color components is stronger than that of the target color component, it is determined that the second threshold dot size is a reference threshold dot size. If the hue of each pixel is within the above-described second hue range in which the coloration of the target color component is strong, it is determined that the second threshold dot size is a corrected threshold dot size larger than the reference threshold dot size.

This increases the amount of ink of the target color component to be applied to each pixel position, as compared with the case of the comparative image recording apparatus, while suppressing overlapping of dots of a plurality of color components and thereby suppressing poor color reproduction and cockling in the case of writing a region where the coloration of the target color component is strong. It is thus possible to improve color reproduction of the target color component, which has a low ink density, to approximately the same level as that of the other color components (cyan and yellow). Consequently, it is possible to represent the desired hue even in the case of writing a region where the coloration of the target color component is strong. Note that the image recording apparatus 1 can also suppress overlapping of dots of a plurality of color components and thereby suppress poor color reproduction and cockling due to mixing of inks in the case of writing a region where the coloration of the target color component is not so strong.

On the recording medium 9, if a black dot and dots of other color components overlap one another, the color components other than black are not recognized so much in the region where the dots overlap. In view of this, as described above, black is set as the first color component, and the first halftone image data indicating the arrangement of black dots is taken into consideration in the case of generating the second halftone image data and the third halftone image that respectively indicate the arrangements of cyan and magenta dots. This prevents cyan and magenta dots from overlapping with black dots and improves color reproduction of an image to be recorded on the recording medium 9. Also, yellow, which has little influence on the other color components, is set as the fourth color component, and the fourth halftone image data is generated through halftone processing similar to that performed on the black tone image without taking into consideration the halftone image data regarding the other color components. This simplifies the generation of the fourth halftone image data while reducing the influence on the halftone images of the other color components.

As described above, the processing of steps S133 to S138 is performed in sequential order from a pixel position 751 at one end to a pixel position 751 at the other end in rows or columns of the pixel positions 751 in the halftone image region 75. In this way, by reducing the number of inflection points where the direction in which the processing proceeds is changed in the processing order in which the processing of steps S133 to S138 is performed, the number of pixels at which the second dot size has not yet been determined around the pixel of interest can be made substantially constant, irrespective of how far the processing has advanced (i.e., the position of the pixel of interest). Consequently, it is possible to maintain uniform quality of the processing of steps S133 to S138 over substantially the entire halftone image region.

Similarly, the processing of steps S143 to S152 is performed in sequential order from a pixel position 751 at one end to a pixel position 751 at the other end in rows or columns of the pixel positions 751 in the halftone image region 75. In this way, by reducing the number of inflection points where the direction in which the processing proceeds is changed in the processing order in which the processing of steps S143 to S152 is performed, the number of pixels at which the third dot size has not yet been determined around the pixel of interest can be made substantially constant, irrespective of how far the processing has advanced (i.e., the position of the pixel of interest). Consequently, it is possible to maintain uniform quality of the processing of steps S143 to S152 over substantially the entire halftone image region.

The image recording apparatus 1 performs separation processing along with gray component replacement on the color image (step S11) prior to the step of generating the first halftone image data (step S12). It is thus possible to suppress overlapping of dots of multiple colors formed at each pixel position and to efficiently suppress poor color reproduction and cockling.

The image recording apparatus 1 may change the threshold values in the large dot matrix 811, the medium dot matrix 812, and the small dot matrix 813 of the matrix set for magenta during repetition of steps S143 to S152 in step S14. For example, the threshold values in each threshold matrix may be changed by assigning a random number to the threshold values in the threshold matrix every time the size of a dot to be formed at one pixel position is determined. Alternatively, a random number may be assigned every time the sizes of dots to be formed in one row of pixel positions are determined. By changing the threshold values in a matrix set in this way, the change in the sizes of dots in step S151 can irregularly occur in the entire halftone image region. In other words, it is possible to increase the irregularity of occurrence of the above dot size change. As a result, it is possible to suppress the appearance of an unintentional regular pattern accompanying the dot size change. The same applies to step S13.

Figure 14:
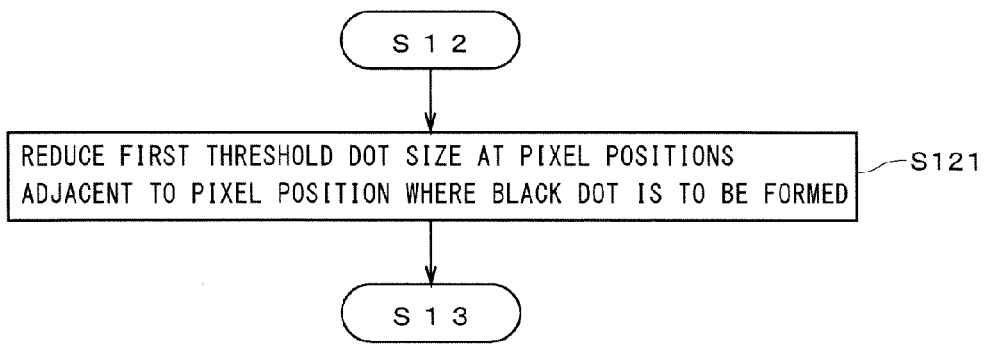

The image recording apparatus 1 may perform another step between steps S12 and S13 as illustrated in FIG. 14, specifically, a step of extracting a pixel position at which it is determined in step S12 that a black dot of a predetermined size or more is to be formed, and reducing the first threshold dot sizes at pixel positions that are adjacent to the extracted pixel position (step S121). Specifically, a pixel position having a halftone pixel value of "1" or more (i.e., a pixel position where a small, medium, or large black dot is to be formed), for example, is extracted on the basis of the first halftone image data generated in step S12. Then, the first threshold dot sizes at four pixel positions that are adjacent to the upper, lower, left, and right sides of the extracted pixel position are changed from the size corresponding to the sum of the large dot and the small dot (the corresponding amount of ink is 12 pl) to a size corresponding to the sum of the small dot and the small dot (the corresponding amount of ink is 6 pl), for example. Alternatively, the first threshold dot sizes at eight pixel positions that are adjacent to the upper, lower, left, right, and diagonal sides of the extracted pixel position may be reduced. Alternatively, the pixel position to be extracted in step S121 may be a pixel position at which a black dot of the medium size or more is to be formed or a pixel position at which a black dot of the large size or more is to be formed.

This reduces the possibility that cyan dots will be formed at pixel positions adjacent to a pixel position at which black dots of a predetermined size or more are to be formed, and even in the case where cyan dots are formed, it is possible to reduce the sizes of the cyan dots to be formed. Consequently, it is possible to take the spread of black dots after they have been formed on the recording media 9 into consideration and to prevent the spread black dots and the cyan dots from excessively overlapping one another.

Figure 15:
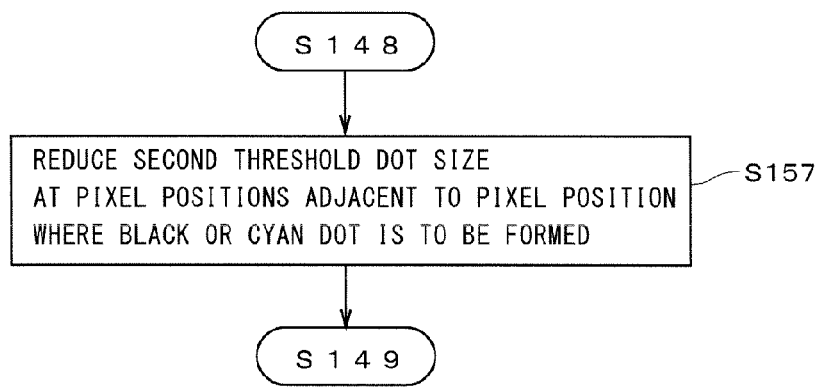

The image recording apparatus 1 may also perform another step between step S148 and step S149 as illustrated in FIG. 15, specifically, a step of extracting a pixel position at which it is determined in step S12 or S13 that a black or cyan dot of a predetermined size or more is to be formed, and reducing the second threshold dot sizes at pixel positions that are adjacent to the extracted pixel position (step S157). Specifically, for example, a pixel position having a halftone pixel value of "1" or more is extracted on the basis of the first halftone image data, and a pixel position having a halftone pixel value of "1" or more is extracted on the basis of the second halftone image data. In other words, a pixel position at which a black dot of the small size or more is to be formed and a pixel position at which a cyan dot of the small size or more is to be formed are extracted. Then, the second threshold dot sizes at pixel positions that are adjacent to the upper, lower, left, and right sides of the extracted pixel positions or that are adjacent to the upper, lower, left, right, and diagonal sides of the extracted pixel positions are reduced from the reference threshold dot size (the corresponding amount of ink is 18 pl) or the corrected threshold dot size (the corresponding amount of ink is 21 pl) by an amount corresponding to the small size (the corresponding amount of ink is 3 pl), for example. Alternatively, the pixel position to be extracted in step S157 may be a pixel position at which a black or cyan dot of the medium size or more is to be formed, or a pixel position at which a black or cyan dot of the large size is to be formed.

This reduces the possibility that magenta dots will be formed at pixel positions adjacent to pixel positions where black or cyan dots of a predetermined size or more are formed, and even in the case where magenta dots are formed, it is possible to reduce the sizes of the magenta dots to be formed. Consequently, it is possible to take the spread of black and cyan dots after they have been formed on the recording media 9 into consideration and to prevent the spread black and cyan dots and the magenta dots from excessively overlapping one another. Note that step S157 does not necessarily have to be performed between steps S148 and S149 as long as it is performed after steps S144 to S146 and before step S149.

As described above, the image recording apparatus 1 records the halftone images of black, cyan, magenta, and yellow in this order on the recording medium 9 and generates single-color halftone image data in this recording order (i.e., in the order of black, cyan, magenta, and yellow). Specifically, single-color halftone image data regarding black is first generated, and then single-color halftone image data regarding another color component is generated. In the case of generating the single-color halftone image data regarding another color component, if, at each pixel position, only a black dot is formed as a dot of the color component preceding the other color component in the above recording order, the image recording apparatus 1 determines that the sum of the sizes of the black dot and the dot of the other color component is smaller than or equal to a predetermined maximum dot size. When the other color component is the target color component, the maximum dot size is increased as compared with the case where the other color component is a color component other than the target color component.

Specifically, when the other color component is cyan or yellow, the maximum dot size is a size that corresponds to 12 pl of ink, for example. When the other color component is magenta, which is the target color component, the maximum dot size is a size that corresponds to 15 pl of ink, for example. Thus, if a cyan dot is recorded following a black dot at each pixel position, the sum of the sizes of the black and cyan dots is a size that corresponds to 12 pl of ink (e.g., the sum of the medium size and the medium size). If cyan and magenta dots are not recorded and a yellow dot is recorded following a black dot at each pixel position, the sum of the sizes of the black and yellow dots is a size corresponding to 12 pl of ink (e.g., the sum of the large size and the small size).

On the other hand, if a cyan dot is not recorded and then a magenta dot is recorded following a black dot at each pixel position, the sum of the sizes of the black and magenta dots is a size corresponding to 15 pl of ink (e.g., the sum of the medium size and the large size). Although dots of other color components that overlap with a black dot are not very recognizable on the recording medium 9, the coloration of the other color components is recognizable to some degree if the size of the black dot is smaller than or equal to a predetermined size. Thus, in terms of the upper limit value (i.e., the above-described maximum size) of the sum of the sizes of a black dot and dots of the other color components, the upper limit value of the target color component is increased to greater than the upper limit values of the other color components as described above, so that when a magenta dot as the target color component is recorded following a black dot, it is possible to improve the color reproduction of the magenta dot. As a result, even if a dot of another color component that is recorded following a black dot is magenta, which has a lower ink density than cyan and yellow, color reproduction on the same level as in the case where the other component is cyan or yellow can be achieved.

Figure 16:
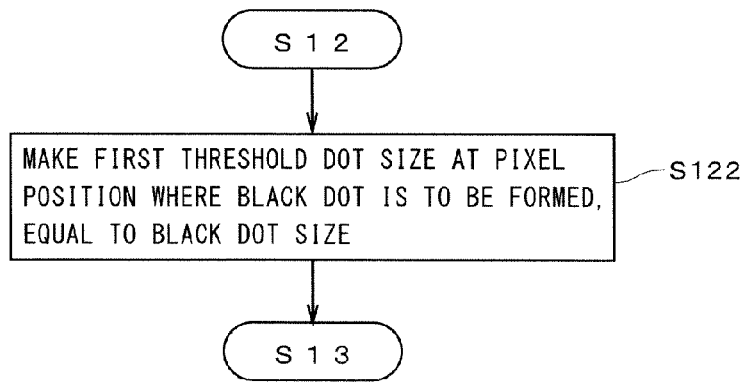

Alternatively, the image recording apparatus 1 may be configured to not form a dot of another color component such as cyan or magenta at a pixel position where a black dot is formed. In this case, another step is performed between steps S12 and S13 as illustrated in FIG. 16, specifically, a step of equating the first threshold dot size at a pixel position at which it is determined in step S12 that a black dot is to be formed and the size of the black dot (step S122). By doing so, it is always determined in step S135 that the first total dot size at a pixel position at which a black dot is to be formed is larger than the first threshold dot size, with the exception of the case where the provisional second dot size, which is the provisionally determined size of a cyan dot, is the zero size. Accordingly, a cyan dot is not formed at the pixel position where a black dot is formed. This consequently prevents a cyan dot from overlapping with a black dot and thereby improves the color reproduction of cyan in the image recorded on the recording medium 9.

Figure 17:
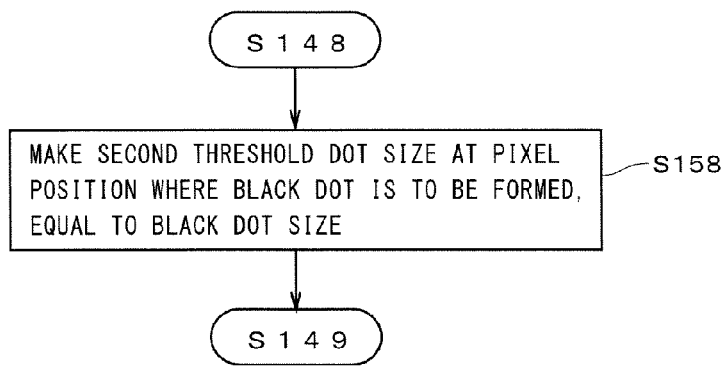

Moreover, another step is also performed between steps S148 and S149 as illustrated in FIG. 17, specifically, a step of equating the second threshold dot size at a pixel position at which it is determined in step S12 that a black dot is to be formed and the size of the black dot (step S158). By doing so, it is always determined in step S149 that the second total dot size at the pixel position where a black dot is to be formed is larger than the second threshold dot size, with the exception of the case where the provisional second dot size, which is the provisionally determined size of a magenta dot, is the zero size. Accordingly, a magenta dot is not formed at the pixel position where a black dot is formed. This consequently prevents a magenta dot from overlapping with a black dot and thereby improves the color reproduction of magenta in the image recorded on the recording medium 9. Note that step S158 does not necessarily have to be performed between steps S148 and S149 as long as it is performed after steps S144 to S146 and before step S149.

Next, an image recording apparatus according to a second embodiment of the present invention will be described. The image recording apparatus according to the second embodiment has substantially the same configuration as that of FIG. 1. In the following description, constituent elements that correspond to those in FIG. 1 are denoted by the same reference numerals. In the image recording apparatus according to the second embodiment, the functions of the control unit 4 are similar to those in FIG. 3, and the operation of recording an image is similar to that illustrated in FIG. 5. The second embodiment, however, differs in part from the first embodiment in the functions of the second halftone image data generation part 426 and the third halftone image data generation part 427 and in the detailed procedure of steps S13 and S14, as described below.

Figure 18:
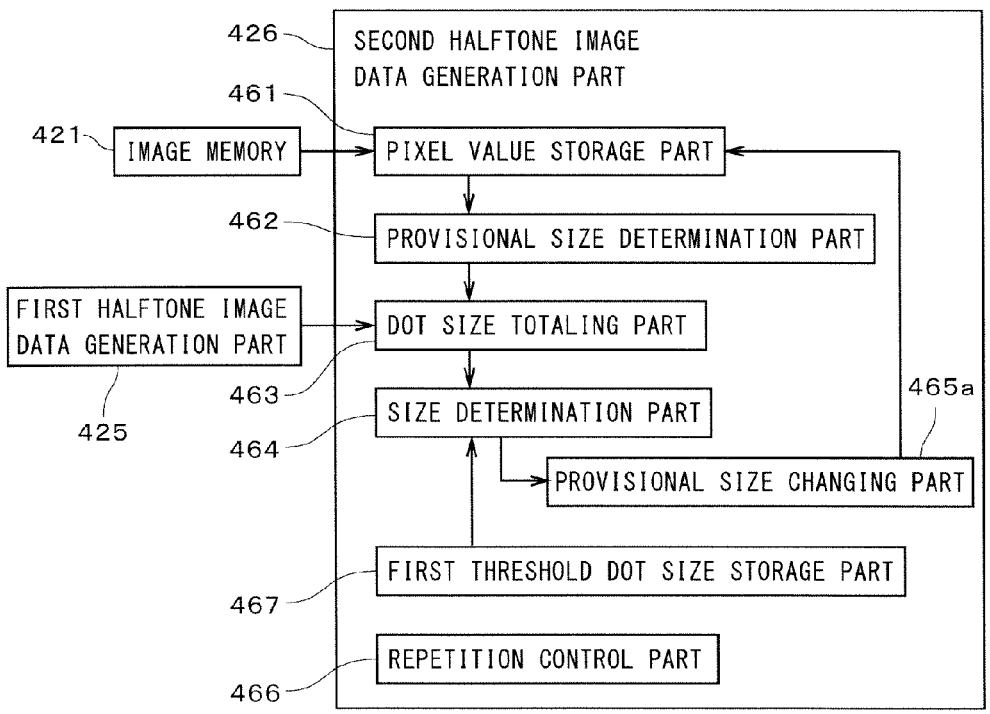
FIG. 18 is a block diagram illustrating functions of a second halftone image data generation part according to a second embodiment.
Figure 19A:
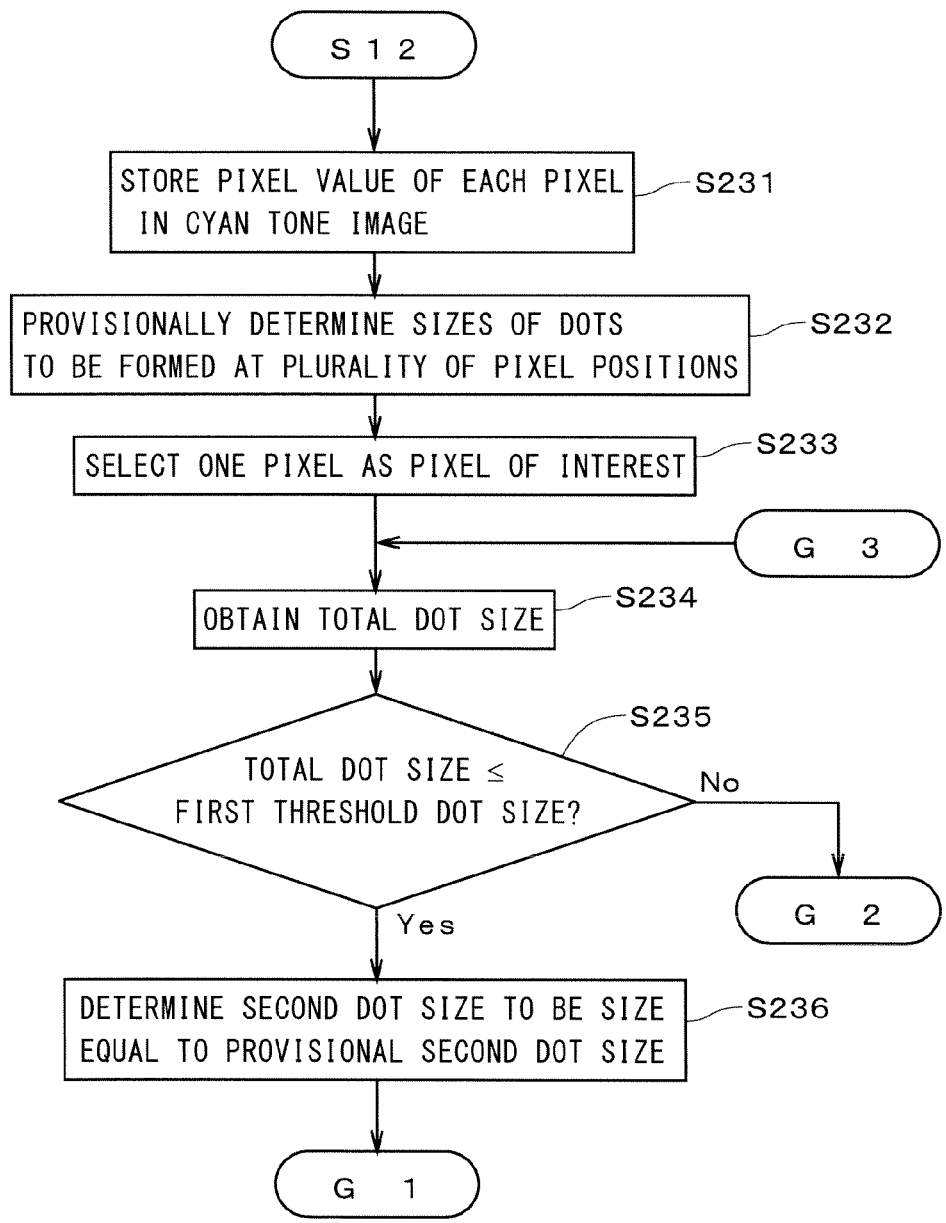
FIGS. 19A and 19B illustrate part of the procedure of image recording.
Figure 19B:
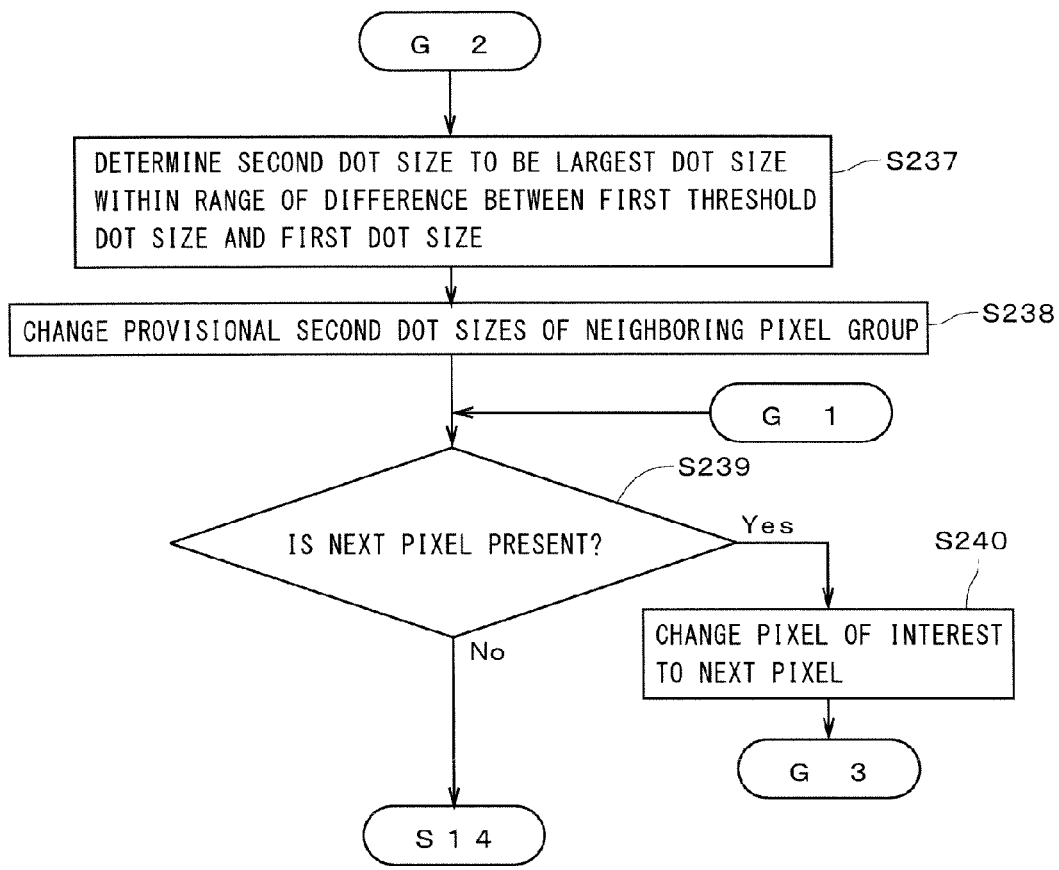
Figure 20:
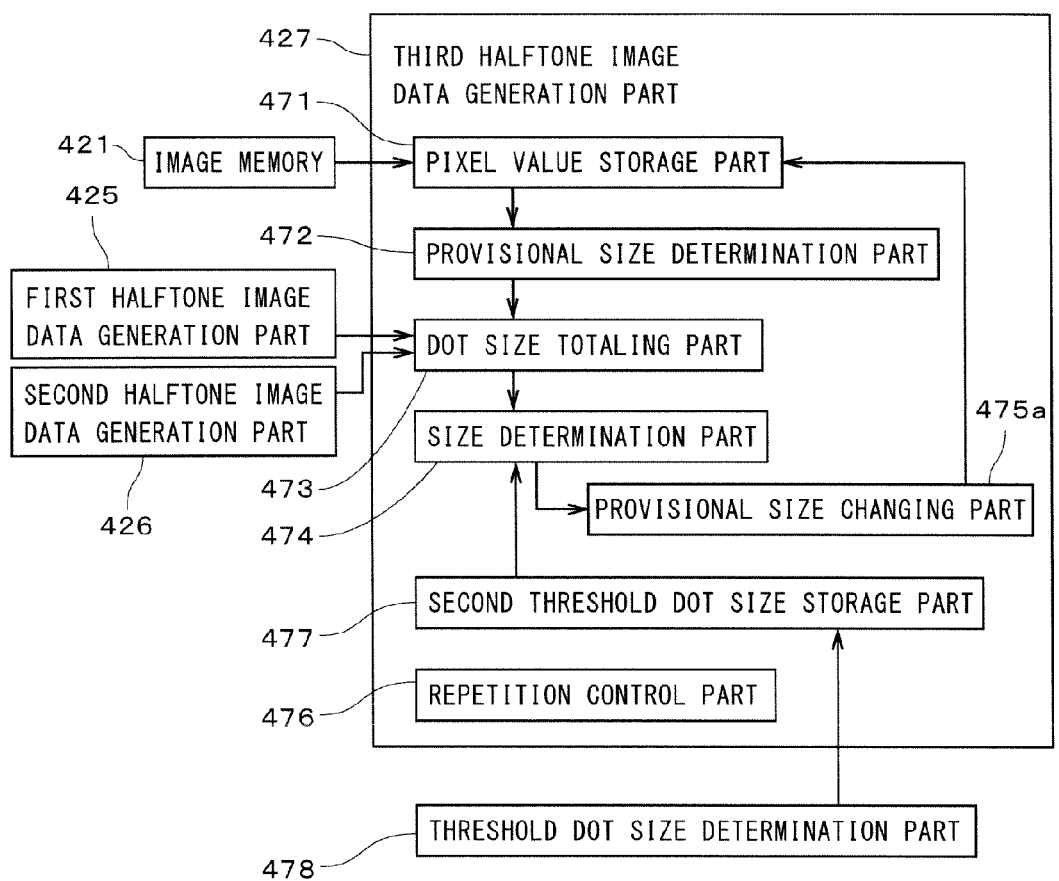
FIG. 20 is a block diagram illustrating functions of a third halftone image data generation part.

FIGS. 18 and 20 are block diagrams respectively illustrating functions of the second halftone image data generation part 426 and the third halftone image data generation part 427 according to the second embodiment. As illustrated in FIGS. 18 and 20, the second halftone image data generation part 426 and the third halftone image data generation part 427 respectively include provisional size changing parts 465*a* and 475*a*, instead of the pixel value changing parts 465 and 475 (see FIGS. 8 and 12). FIGS. 19A and 19B and FIGS. 21A and 21B illustrate detailed procedures of steps S13 and S14, respectively.

The second halftone image data generation part 426 illustrated in FIG. 18 reads a cyan tone image from the image memory 421 and stores the pixel value of each pixel in the pixel value storage part 461 as in step S131 (step S231). Then, the provisional size determination part 462 performs halftone processing on the cyan tone image, which is a second color component image (i.e., the cyan tone image is halftoned), similarly to the halftone processing performed in step S12 on the black tone image, by comparing the pixel value of each pixel in the cyan tone image with threshold values in the matrix set for cyan. Through this, the sizes of a plurality of cyan dots that are respectively to be formed at a plurality of pixel positions in the halftone image region are provisionally determined (step S232).

Next, one of the pixels in the cyan tone image is selected as a pixel of interest (step S233), and the dot size totaling part 463 acquires the first dot size, which is the size of a black dot to be formed at a target pixel position corresponding to the pixel of interest, from the first halftone image data generation part 425. The dot size totaling part 463 then obtains a first total dot size that is the sum of the first dot size and a provisional second dot size at the target pixel position, the provisional second dot size being the size of a cyan dot provisionally determined in step S232 (step S234).

The size determination part 464 compares the first total dot size with the first threshold dot size that is stored in advance in the first threshold dot size storage part 467 (step S235). The comparison between the first total dot size and the first threshold dot size is performed by comparing the amounts of ink or halftone pixel values corresponding to the first total dot size and the first threshold dot size as in step S135.

If the first total dot size is smaller than or equal to the first threshold dot size, the size determination part 464 determines that a second dot size that is the size of a cyan dot to be formed at the target pixel position is a size equal to the provisional second dot size (step S236). If the first total dot size is larger than the first threshold dot size, it is determined that the second dot size is a largest dot size within the range of difference between the first threshold dot size and the first dot size as in step S137 (step S237).

If it has been determined in step S235 that the first total dot size is larger than the first threshold dot size, step S237 is followed by a step of extracting pixels (hereinafter referred to as a "neighboring pixel group") at one or more pixel positions that are located around the pixel of interest and at which the second dot size has not yet been determined from the cyan tone image. Neighboring pixels included in the neighboring pixel group are pixels each having a predetermined positional relationship with the pixel of interest. In the present embodiment, the neighboring pixel group includes two neighboring pixels 703 that are adjacent to the right side and bottom side of a pixel of interest 702 as illustrated in FIG. 10. Then, the provisional size changing part 465*a* changes the provisional second dot sizes in the neighboring pixel group on the basis of a difference between the provisional second dot size and the second dot size at the target pixel position (step S238).

For example, in the case where the provisional second dot size at the target pixel position is the large size (the corresponding amount of ink is 9 pl) and the second dot size is the small size (the corresponding amount of ink is 3 pl), the amount of ink that corresponds to the difference between the provisional second dot size and the second dot size is 9−3=6 pl. This amount of ink, i.e., 6 pl, is equally distributed to the two neighboring pixels 703. In other words, 3 pl is added to the amount of ink corresponding to the provisional second dot size of each neighboring pixel 703. This will change the provisional second dot sizes of the neighboring pixels 703 by one size. For example, when the provisional second dot size before change is the zero size, the provisional second dot size is changed to the small size. When the provisional second dot size before change is the small size, the provisional second dot size is changed to the medium size, and when the provisional second dot size before change is the medium size, the provisional second dot size is changed to the large size. Note that when the provisional second dot size before change is the large size, the provisional second dot size remains unchanged. In this case, the amount of ink that is not used to change the provisional second dot size may be used to change the provisional second dot size of another neighboring pixel 703.

In the case where the provisional second dot size at the target pixel position is the medium size (the corresponding amount of ink is 6 pl) and the second dot size is the small size (the corresponding amount of ink is 3 pl), the amount of ink corresponding to the difference between the provisional second dot size and the second dot size is 6−3=3 pl. This amount of ink, 3 pl, is equally distributed to the two neighboring pixels 703. In other words, 1.5 pl is added to the amount of ink corresponding to the provisional second dot size of each neighboring pixel 703. This amount of ink, 1.5 pl, corresponds to one half the differences in dot size (i.e., the difference between the large size and the medium size, the difference between the medium size and the small size, and the difference between the small size and the zero size), and therefore the amount of ink applied to each neighboring pixel 703 does not correspond to a dot size that can be represented by the image recording apparatus 1. In this case, for example, 3 pl may be added to the amount of ink corresponding to the provisional second dot size of each neighboring pixel 703 so as to increase the provisional second dot size of the neighboring pixel 703 by one size, and the extra 1.5 pl of ink added to each neighboring pixel 703 may be subtracted from pixels in the neighborhood of the neighboring pixel 703 at the time when the neighboring pixel 703 is selected as a pixel of interest.

When the second dot size at the target pixel position has been determined and the provisional second dot sizes in the neighboring pixel group have been changed as necessary, the pixel of interest is changed to the next pixel in accordance with a predetermined processing order (see FIG. 11) of the pixel positions 751 (steps S239 and S240). The procedure then returns to step S234, and the processing of steps S234 to 238 is performed on the new pixel of interest. The processing of steps S234 to S238 is performed in sequential order from a pixel position 751 at one end to a pixel position 751 at the other end in rows of the pixel positions 751 in the halftone image region 75 as illustrated in FIG. 11. Alternatively, the processing of steps S234 to S238 may be performed in sequential order from a pixel position 751 at one end to a pixel position 751 at the other end in columns of the pixel positions 751 in the halftone image region 75.

The image recording apparatus according to the second embodiment repeats steps S234 to S240 under the control of the repetition control part 466 in FIG. 18 until the second dot sizes are determined for the pixel positions 751 corresponding to all the pixels in the cyan tone image. Through this, the second halftone image data used to record a cyan image is generated.

When the generation of the second halftone image data has ended, the threshold dot size determination part 478 in FIG. 20 determines a second threshold dot size at each pixel position in the above color image. Specifically, as in steps S143 to S146, the hue of each pixel corresponding to each pixel position in the color image that has undergone gray-component replacement is obtained (step S241). If the hue of each pixel is within the above-described first hue range, it is determined that the second threshold dot size is a reference threshold dot size, and if the hue of each pixel is within the above-described second hue range, it is determined that the second threshold dot size is a corrected threshold dot size (steps S242 to S244). The second threshold dot size at each pixel position is stored in the second threshold dot size storage part 477.

Then, as in step S141, a tone image of magenta, which is the target color component, is read from the image memory 421, and the pixel of each pixel in the magenta tone image is stored in the pixel value storage part 471 (step S245). Then, the provisional size determination part 472 performs halftone processing on the magenta tone image (i.e., the magenta tone image is halftoned) as in step S232 by comparing the pixel value of each pixel in the magenta tone image, which is the third color component image, with the threshold values in the matrix set for magenta. Through this, the sizes of a plurality of magenta dots that are respectively to be formed at a plurality of pixel positions in the halftone image region are provisionally determined (step S246).

Next, one of the pixels in the magenta tone image is selected as a pixel of interest (step S247), and the dot size totaling part 473 acquires first and second dot sizes at the target pixel position from the first halftone image data generation part 425 and the second halftone image data generation part 426. The sum of the first dot size and the second dot size is referred to as a "previous total dot size" as described above. Then, a second total dot size at the target pixel position is obtained, the second total dot size being the sum of the previous total dot size and a provisional third dot size that is the size of a magenta dot provisionally determined in step S246 (i.e., a provisional dot size) (step S248).

The size determination part 464 compares the second total dot size with the second threshold dot size that is stored in advance in the second threshold dot size storage part 477 (step S249). The comparison between the second total dot size and the second threshold dot size is performed by comparing the amounts of ink or the halftone pixel values corresponding to the second total dot size and the second threshold dot size as in step S235. If the hue at the target pixel position is within the above-described first hue range, the second threshold dot size is equal to a reference threshold dot size (the corresponding amount of ink is 18 pl). If the hue at the target pixel position is within the above-described second hue range in which the coloration of magenta, which is the target color component, is stronger than in the first hue range (i.e., reddish coloration is strong), the second threshold dot size is equal to a corrected threshold dot size (the corresponding amount of ink is 21 pl).

If the second total dot size is smaller than or equal to the second threshold dot size, the size determination part 474 determines that a third dot size, which is the size of a magenta dot to be formed at the target pixel position, is a size equal to the provisional third dot size, as in step S150 (step S250). On the other hand, if the second total dot size is larger than the second threshold dot size, it is determined as in step S151 that the third dot size is a largest dot size within the range of the difference between the second threshold dot size and the previous total dot size (step S251).

When it has been determined in step S249 that the second total dot size is larger than the second threshold dot size, step S251 is followed by a step of extracting a neighboring pixel group, which includes pixels at one or more pixel positions that are located around the pixel of interest and at which the third dot size has not yet been determined, from the magenta tone image. As described above, neighboring pixels included in the neighboring pixel group are pixels each having a predetermined positional relationship with the pixel of interest. In the present embodiment, the neighboring pixel group includes two neighboring pixels 703 that are adjacent to the right side and bottom side of a pixel of interest 702 as illustrated in FIG. 10. Then, the provisional size changing part 475*a* changes the provisional third dot sizes in the neighboring pixel group on the basis of a difference between the provisional third dot size and the third dot size at the target pixel position, as in step S238 (step S252).

When the third dot size at the target pixel position has been determined and the provisional third dot sizes in the neighboring pixel group have been changed as necessary, the pixel of interest is changed to the next pixel in accordance with a predetermined processing order (FIG. 11) of the pixel positions 751 (steps S253 and S254). The procedure then returns to step S248, and the processing of steps S248 to S252 is performed on the next pixel of interest. As illustrated in FIG. 11, the processing of steps S248 to S252 is performed in sequential order from a pixel position 751 at one end to a pixel position 751 at the other end in rows of the pixel positions 751 in the halftone image region 75, as in steps S234 to S238. Alternatively, the processing of steps S248 to S252 may be performed in sequential order from a pixel position 751 at one end to a pixel position 751 at the other end in columns of the pixel positions 751 in the halftone image region 75.

The image recording apparatus according to the second embodiment repeats steps S248 to S254 under the control of the repetition control part 476 in FIG. 20 until the third dot sizes are determined for the pixel positions 751 corresponding to all the pixels in the magenta tone image. Through this, the third halftone image data is generated, which is single-color halftone image data that is used to record a magenta image. The third halftone image data generation part 427 is a target color component halftone image data generation part that generates single-color halftone image data regarding the target color component.

As described above, in the case of generating the second halftone image data indicating the sizes of cyan (second color component) dots, the image recording apparatus according to the second embodiment performs halftone processing on the cyan tone image with reference to the first halftone image data indicating the sizes of black (first color component) dots as in the first embodiment. Then, the previous total dot size, which is the sum of the size of a black dot (first dot size) and the size of a cyan dot (second dot size) that are to be formed at each pixel position, is made smaller than or equal to a predetermined first threshold dot size. This prevents black and cyan dots from excessively overlapping each other. Consequently, it is possible to suppress poor color reproduction and cockling due to mixing of black and cyan inks.

When the cyan dot size that has been provisionally determined by the comparison with the matrix set is changed in order to make the previous total dot size smaller than or equal to the first threshold dot size, the provisional second dot sizes in the neighboring pixel group in the vicinity of the pixel of interest at which the dot size is changed are changed on the basis of the amount of change in the cyan dot size (i.e., the difference between the provisional second dot size and the second dot size) at the target pixel position. It is thus possible to correct the influence caused by the change in the cyan dot size and to accurately represent the cyan tone image on the recording medium 9.

In the case of generating the third halftone image data indicating the sizes of magenta (third color component) dots, the image recording apparatus according to the second embodiment performs halftone processing on the magenta tone image with reference to the first halftone image data and the second halftone image data as in the first embodiment. Then, the sum of the size of a black dot, the size of a cyan dot, and the size of a magenta dot (third dot size) that are to be formed at each pixel position is made smaller than or equal to a predetermined second threshold dot size. This prevents black, cyan, and magenta dots from excessively overlapping one another. Consequently, it is possible to suppress poor color reproduction or cockling due to mixing of black, cyan, and magenta inks.

When the magenta dot size that has been provisionally determined by the comparison with the matrix set is changed in order to make the sum of the sizes of black, cyan, and magenta dots smaller than or equal to the second threshold dot size, the provisional third dot sizes in the neighboring pixel group in the vicinity of the pixel of interest at which the dot size is changed are changed on the basis of the amount of change in the magenta dot size (i.e., the difference between the provisional third dot size and the third dot size) at the target pixel position. It is thus possible to correct the influence caused by the change in the magenta dot size and to accurately represent the magenta tone image on the recording medium 9.

The image recording apparatus according to the second embodiment obtains the hue of each pixel corresponding to each pixel position 751 in the color image and changes the second threshold dot size, which is the threshold dot size for the target color component (magenta) at the pixel position 751 in accordance with the hue of the pixel, as in the first embodiment. Specifically, if the hue of each pixel is within the above-described first hue range in which the coloration of the other color components is stronger than that of the target color component, it is determined that the second threshold dot size is a reference threshold dot size. If the hue of each pixel is within the above-described second hue range in which the coloration of the target color component is strong, it is determined that the second threshold dot size is a corrected threshold dot size larger than the reference threshold dot size.

This increases the amount of ink of the target color component to be applied to each pixel position, as compared with the case of the comparative image recording apparatus, while suppressing overlapping of dots of a plurality of color components and thereby suppressing poor color reproduction and cockling in the case of writing a region where the coloration of the target color component is strong. It is thus possible to improve color reproduction of the target color component, which has a low ink density, to approximately the same level as that of the other color components (cyan and yellow). Consequently, it is possible to represent the desired hue even in the case of writing a region where the coloration of the target color component is strong. Note that the image recording apparatus 1 can also suppress overlapping of dots of a plurality of color components and thereby suppress poor color reproduction and cockling due to mixing of inks in the case of writing a region where the coloration of the target color component is not so strong.

As described above, the processing of steps S248 to S252 is performed in sequential order from pixel position 751 at one end to a pixel position 751 at the other end in rows or columns of the pixel positions 751 in the halftone image region 75. Thus, as in the first embodiment, the number of pixels at which the third dot size has not yet been determined in the vicinity of the pixel of interest can be kept substantially constant, irrespective of how far the processing has advanced (i.e., the position of the pixel of interest). Consequently, it is possible to maintain uniform quality of the processing of steps S248 to S252 over substantially the entire halftone image region. Similarly, it is also possible to maintain uniform quality of the processing of steps S234 to S238 over substantially the entire halftone image region.

The image recording apparatus according to the second embodiment may perform another step between steps S12 and step 13 as in the first embodiment, specifically, a step of extracting a pixel position at which it is determined in step S12 that a black dot of a predetermined size or more is to be formed, and reducing the first threshold dot size at pixel positions that are adjacent to the extracted pixel position (FIG. 14, step S121). This reduces the possibility that cyan dots will be formed at pixel positions adjacent to a pixel position at which a black dot of a predetermined size or more is formed, and even in the case where cyan dots are formed, it is possible to reduce the sizes of the cyan dots to be formed. Consequently, it is possible to prevent cyan dots from excessively overlapping on the recording medium 9 with black dots that have spread.

Also, another step may be performed between steps S248 and S249 as in step S157 in FIG. 15, specifically, a step of extracting a pixel position at which it is determined in step S12 or S13 that a black or cyan dot of a predetermined size or more is to be formed, and reducing the second threshold dot sizes at pixel positions that are adjacent to the extracted pixel position. This reduces the possibility that magenta dots will be formed at pixel positions adjacent to a pixel position at which a black or cyan dot of a predetermined size or more is formed, and even in the case where magenta dots are formed, it is possible to reduce the sizes of the magenta dots to be formed. Consequently, it is possible to take the spread of black and cyan dots after they have been formed on the recording medium 9 into consideration, and to thereby prevent a magenta dot from excessively overlapping with the black and cyan dots that have spread. Note that the above-described change in the second threshold dot size does not necessarily have to be performed between steps S248 and S249 as long as it is performed after steps S241 to S244 and before step S249.

The image recording apparatus according to the second embodiment first generates single-color halftone image data regarding black and then generates single-color halftone image data regarding another color component as in the first embodiment. In the case of generating single-color halftone image data regarding the other color component, if, at each pixel position, only a black dot is formed as a dot of the color component preceding the other color component in the above recording order, it is determined that the sum of the sizes of the black dot and a dot of the other color component is smaller than or equal to a predetermined maximum dot size. If the other color component is the target color component, the maximum dot size is increased as compared with the case where the other color component is a color component other than the target color component.

In terms of the upper limit value (i.e. the above-described maximum size) of the sum of the sizes of a black dot and dots of the other color components, the upper limit of the target color component is increased to more than those of the other color components, so that when a magenta dot as the target color component is recorded following a black dot, it is possible to improve the color reproduction of the magenta dot. As a result, even if a dot of another color component that is recorded following a black dot is magenta, which has a lower ink density than cyan and yellow, color reproduction of the same level as in the case where the other component is cyan or yellow can be achieved.

Alternatively, the image recording apparatus according to the second embodiment may be configured to not form any dot of other color components such as cyan and magenta at a pixel position where a black dot is formed, as in the first embodiment. In this case, another step is performed between steps S12 and S13, specifically, a step of equating the first threshold dot size at a pixel position at which it is determined in step S12 that a black dot is to be formed and the size of the black dot (FIG. 16, step S122). This prevents a cyan dot from overlapping with a black dot and thereby improves the color reproduction of cyan in the image recorded on the recording medium 9.

Also, another step is performed between steps S248 and S249 similarly to step S158 illustrated in FIG. 17, specifically, a step of equating the second threshold dot size at a pixel position at which it is determined in step S12 that a black dot is to be formed and the size of the black dot. This prevents a magenta dot from overlapping with a black dot and thereby improves the color reproduction of magenta in the color image recorded on the recording medium 9. Note that the processing of equating the second threshold dot size and the size of a black dot does not necessarily have to be performed between steps S248 and S249 as long as it is performed after steps S241 to S244 and before step S249.

The image recording apparatuses described above can be modified in various ways.

For example, the amounts of ink droplets that correspond respectively to the large dot, the medium dot, and the small dot may be appropriately changed. Appropriate change may also be made to the characteristics of the matrix set illustrated in FIG. 4. The sizes of dots of each color ink, excluding the zero size, do not necessarily have to be of the three types consisting of the large size, the medium size, and the small size, and may be of one type, two types, or four or more types.

The first threshold dot size described above is not limited to the dot size corresponding to 12 pl of ink, and may be changed appropriately. The reference threshold dot size and the corrected threshold dot size for the second threshold dot size are also not limited to the dot sizes corresponding respectively to 18 pl and 21 pl of ink, and may be changed appropriately.

In the case of changing the pixel values in the neighboring pixel group in step S138 or S152, a pixel value obtained by multiplying the above-described multiplication result by a coefficient (e.g., 0.8) may be equally distributed and added to each neighboring pixel 703. In the case of changing the provisional second dot sizes in the neighboring pixel group in step S238, a value obtained by multiplying the difference between the provisional second dot size and the second dot size by a coefficient (e.g., 0.8) may be equally distributed to each neighboring pixel 703. The same applies to the case of changing the provisional third dot sizes in step S252.

While in the above-described embodiment, the neighboring pixels included in the neighboring pixel group are two pixels that are adjacent to the right side and bottom side of the pixel of interest, the positional relationship between the pixel of interest and the neighboring pixels may be modified in various ways. In addition, appropriate change may be made to the amount of change in the pixel values of the neighboring pixels or the amount of change in the provisional dot sizes. For example, in step S138, the neighboring pixels may be four pixels that are adjacent to the right, lower-right, bottom, and lower-left sides of the pixel of interest. The same applies to steps S152, S238, and S252. In this case, in step S138, for example, the pixel value of the pixel of interest 702 may be multiplied by a value obtained by dividing the difference between the provisional second dot size and the second dot size by the provisional second dot size, and seven-sixteenth of the above multiplication result may be added to the pixel value of the neighboring pixel that is adjacent to the right side of the pixel of interest. Then, one-sixteenth, five-sixteenth, and three-sixteenth of the above multiplication result may be respectively added to the pixel values of the neighboring pixels that are adjacent to the lower-right, bottom, and lower-left sides of the pixel of interest. The neighboring pixels do not necessarily have to be adjacent to the pixel of interest, and may be pixels that are spaced from the pixel of interest as long as they are located at pixel positions in the vicinity of the pixel of interest.

In the case where the pixel of interest is located at or near the edge of an image and some of the neighboring pixels included in the neighboring pixel group are not present, among pixel values that are to be distributed to the neighboring pixel group when a dot size is changed, those pixel values that were supposed to be added to the absent neighboring pixels may be distributed and added to the existing neighboring pixels in step S138 or S152. Alternatively, among the pixel values that are to be distributed to the neighboring pixel group when a dot size is changed, only some of the pixel values that correspond to the existing neighboring pixels may be added to the existing neighboring pixels. The same applies to the case of changing the provisional dot sizes of the neighboring pixels in steps S238 and S252.

The processing order that indicates the order of pixel positions in which the processing of steps S133 to S138, S143 to S152, S234 to S238, or S248 to S252 is performed is not limited to the example illustrated in FIG. 11, and it may be defined by the Peano curve or the Hilbelt curve, for example.

The image recording apparatus 1 according to the first embodiment may perform the step of determining the second threshold dot size at each pixel position before step S142 as in the second embodiment, instead of performing steps S143 to S146 in FIG. 13A. In this case, the step of obtaining the hue of each pixel corresponding to each pixel position in the color image is performed before step S141 or between steps S141 and S142. Then, if the hue of each pixel is within the above-described first hue range, it is determined that the second threshold dot size at each pixel position is the reference threshold dot size, and if the hue of each pixel is within the above-described second hue range, it is determined that the second threshold dot size is the corrected threshold dot size.

Figure 21A:
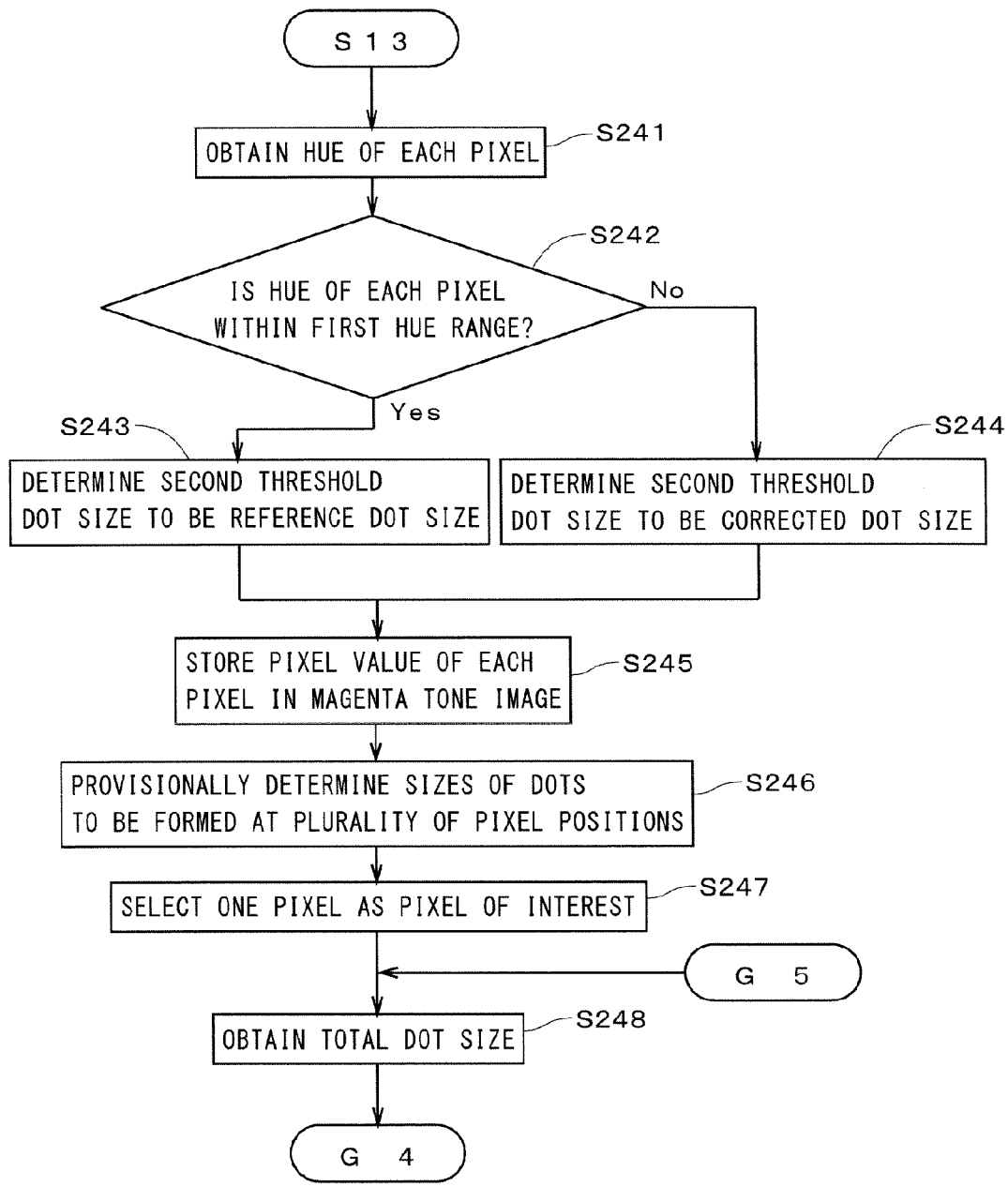
FIGS. 21A and 21B illustrate part of the procedure of image recording.
Figure 21B:
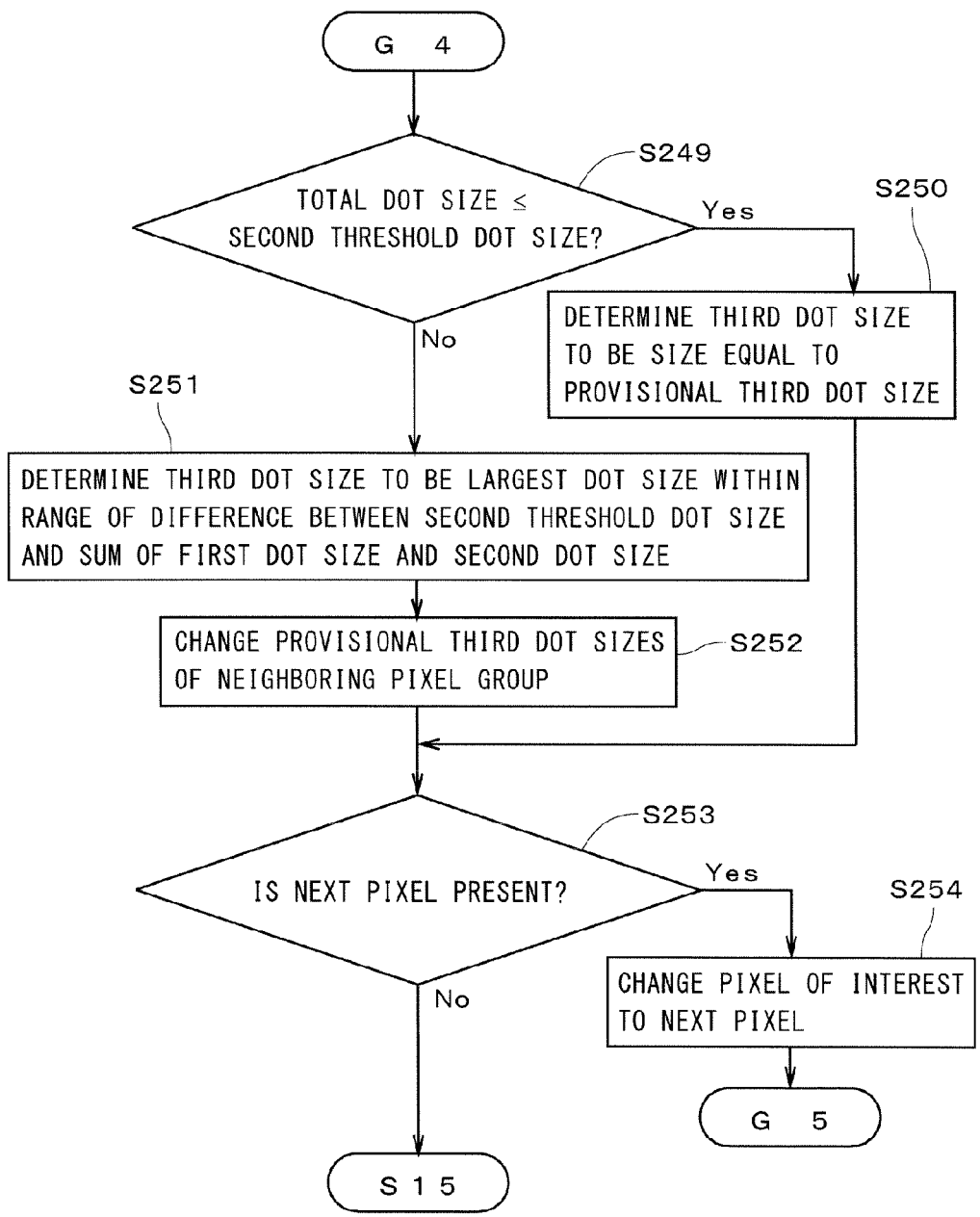

The image recording apparatus according to the second embodiment may perform the step of determining the second threshold dot size at the target pixel position between steps S248 and S249, for example, as in the first embodiment, instead of performing steps S241 to S244 in FIG. 21A. In this case, the hue of the pixel of interest corresponding to the target pixel position is obtained in the color image. Then, if the hue of the pixel of interest is within the above-described first hue range, it is determined that the second threshold dot size at the target pixel position is the reference threshold dot size, and if the hue of the pixel of interest is within the above-described second hue range, it is determined that the second threshold dot size at the target pixel position is the corrected threshold dot size.

The image data generation part 423 may reference the first halftone image data, the second halftone image data, and the third halftone image data in step S15 as with steps S13 and S14 when comparing the pixel value of each pixel in the yellow tone image with the threshold values in the matrix set for yellow, so as to perform halftone processing on the yellow tone image and generate the fourth halftone image data.

The threshold matrices stored in the matrix storage part 422 may be for use in amplitude modulated (AM) screening in which tones are represented by changing the size of a cluster that is a group of regularly arranged dots. Steps S12 and S15 do not necessarily have to be performed by a threshold-matrix method, and for example, an error diffusion method may be used to perform halftone processing on the tone images to generate the first halftone image data and the fourth halftone image data.

Steps S133 and S147 also do not necessarily have to be performed by a threshold-matrix method, and for example, an error diffusion method may be used to perform halftone processing on the tone images to provisionally determine the sizes of dots to be formed at a target pixel position. Specifically, the pixel value of the pixel of interest and a predetermined threshold value that is set for a target pixel position are compared to provisionally determine the size of a dot to be formed at the target pixel position, and then a difference between the pixel value of the pixel of interest and a pixel value corresponding to the provisionally determined dot size is added to the pixel value of the next pixel of interest. In this case as well, it is possible to suppress the appearance of an unintentional regular pattern accompanied by the change in the dot size, by changing the threshold values during repetition of steps S133 to S138 or steps S143 to S148. Similarly, steps S232 and S246 also do not necessarily have to be performed by a threshold-matrix method, and for example, an error diffusion method may be used to perform halftone processing on tone images and provisionally determine the sizes of dots.

The image data generation part 423 may generate the second halftone image data indicating the sizes of cyan dots without referencing the first halftone image data. This simplifies the generation of the second halftone image data.

In the above-described embodiments, separation processing along with gray-component replacement is performed on the color image in step S11, and then the hue of each pixel corresponding to each pixel position in the color image is obtained in step S14. Alternatively, the hue of each pixel may be obtained from the color image before being subjected to gray-component replacement.

The first hue range and the second hue range are not limited to the ranges described above and may be appropriately changed. The first hue range and the second hue range may also be represented by a colorimetric system other than the L*a*b colorimetric system.

In the above-described image recording apparatuses, the recording order in which dots of a plurality of color components are recorded onto the recording medium 9 is not limited to the order of black, cyan, magenta, and yellow, and may be appropriately changed. The order in which the image data generation part 423 generates single-color halftone image data regarding a plurality of color components may also be appropriately changed.

The target color component described above may be a color component other than black or magenta (i.e., the target color component may be cyan or yellow). For example, if the target color component is cyan, the first threshold dot size at each pixel position for cyan is changed on the basis of the hue of each pixel. Specifically, if bluish coloration is strong, the first threshold dot size is increased as compared with the case where bluish coloration is not very strong.

The above-described image recording apparatuses may be used to record dots of ink of color components other than black, cyan, magenta, and yellow. In this case, the target color component may be one of those other color components. Alternatively, two or more color components other than black may be set as target color components, and the threshold dot sizes for each of the target color components (i.e., the upper limit of the sum of the size of a dot of the target color component and the total of the sizes of dots of color components that are to be recorded before the dot of the target color component) may be changed on the basis of the hue of each pixel.

In the above-described embodiments, single-color halftone image data regarding two color components (black and cyan) is generated before the generation of single-color halftone image data regarding the target color component (magenta). The image recording apparatuses are, however, not limited to the example described above, and may be configured such that single-color halftone image data regarding at least one color component included in a plurality of color components of the color image is generated before single-color halftone image data regarding the target color component is generated. The single-color halftone image data regarding at least one color component is generated by at least one single-color halftone image data generation part. The plurality of color components of the color image refer to a plurality of color components that correspond respectively to a plurality of single-color images included in the color image. The target color component is included in the plurality of color components, and is one of the plurality of color components other than the above at least one color component. As described above, ink of the target color component has a lower density than that of the above at least one color component.

In the case of generating single-color halftone image data regarding the target color component, halftone processing is performed on the image of the target color component with reference to single-color halftone image data regarding the above at least one color component. The previous total dot size is the sum of the sizes of dots of the above at least one color component that are to be formed at a target pixel position 751.

While the above at least one color component may include various color components as described above, it includes black in the case where step S122 in FIG. 16 or step S158 in FIG. 17 is performed. On the other hand, in the case where step S121 in FIG. 14 or step S157 in FIG. 15 is performed, the above at least one color component does not necessarily have to include black. In steps S121 and S157, the spread of a dot of a color component that has already been recorded on the recording medium 9 is taken into consideration. This prevents a dot of another color component that is to be recorded later from excessively overlapping with the dot that is previously recorded and spread.

The ejection unit 3 of the image recording apparatus 1 includes one or more heads 31 (i.e., ejecting part) that each eject a fine droplet of ink of at least one color component described above to record a dot of the color component on a recording medium 9. The one or more heads 31 are each controlled on the basis of single-color halftone image data regarding the above at least one color component.

In the image recording apparatus 1, the operation of generating halftone image data and the operation of printing the halftone image data do not necessarily have to be performed in parallel, and if it is possible to provide a memory that is large enough in the output control part 41, the image recording operation may be started after the generation of halftone image data regarding the entire color image is completed.

In the image recording apparatus 1, the ejection unit 3 may be moved in the Y direction by the movement mechanism 2 above the recording media 9 that are not moving, for example, as long as the recording media 9 move in the Y direction relative to the ejection unit 3. The structure of the image recording apparatus 1 may be applied to an image recording apparatus for performing interlace printing, for example, and may also be applied to an image recording apparatus for recording images on a long roll of paper. The recording media 9 may, for example, be films or thin metal plates rather than printing paper.

The image data generation part 423 may be used independently of the image recording apparatus 1 as an image data generation apparatus for generating halftone image data through halftone processing performed on a multi-tone color image. The image data generation part 423 may also be used in image recording apparatuses having other structures. For example, if the image data generation part 423 is used in an electrophotographic image recording apparatus, the sizes of dots determined by the image data generation part 423 are the sizes of dots in a latent image to be recorded on a photo-conductive drum serving as a recording medium. In this case, a light emitting part for irradiating the photo-conductive drum with light to form a latent image serves as a dot output element, and a rotation mechanism for rotating the photo-conductive drum serves as a movement mechanism for moving dot recording positions relative to the recording medium.

The image data generation part 423 may be used in, for example, an image recording apparatus for recording an image on a lithographic plate for each color component serving as a recording medium by scanning the lithographic plate with light beams emitted from a light source through a polygon mirror or the like. In this case, the light source for emitting light beams serves as a dot output element, and the polygon mirror or the like serves as a movement mechanism for moving dot recording positions on the lithographic plate relative to the lithographic plate.

The configurations of the above-described embodiments and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention. This application claims priority benefit under 35 U.S.C. Section 119 of Japanese Patent Application No. 2013-177743 filed in the Japan Patent Office on Aug. 29, 2013, the entire disclosure of which is incorporated herein by reference.

REFERENCE SIGNS LIST

1 Image recording apparatus
2 Movement mechanism
3 Ejection unit
9 Recording medium
31 Head
41 Output control part
70 Tone image
75 Halftone image region
423 Image data generation part
425 First halftone image data generation part
426 Second halftone image data generation part
427 Third halftone image data generation part
428 Fourth halftone image data generation part
472 Provisional size determination part
473 Dot size totaling part
474 Size determination part
475 Pixel value changing part
475a Provisional size changing part
476 Repetition control part
478 Threshold dot size determination part
702 Pixel of interest
703 Neighboring pixel
751 (Target) pixel position
S11 to S21, S121, S122, S131 to S140, S141 to S154, S157, S158, S231 to S240, S241 to S254 Step

The invention claimed is:

1. An image data generation method of generating halftone image data through halftone processing performed on a multi-tone color image that includes images of a plurality of color components, the method comprising:
   a) performing halftone processing on each image of at least one color component among said plurality of color components to generate single-color halftone image data regarding each of said at least one color component, said single-color halftone image data indicating sizes of a plurality of dots that are respectively to be formed at a plurality of pixel positions that are arranged in a matrix in a halftone image region;
   b) obtaining a hue of each pixel that corresponds to each pixel position in said color image, and in a case where the hue of said each pixel is within a first hue range, determining that a threshold dot size at said each pixel position for a target color component is a predetermined reference threshold dot size, said target color component being included in said plurality of color components and being one color component other than said at least one color component, and in a case where the hue of said each pixel is within a second hue range in which coloration of said target color component is stronger than in said first hue range, determining that said threshold dot size is a predetermined corrected threshold dot size that is larger than said reference threshold dot size; and
   c) performing halftone processing on an image of said target color component with reference to the single-color halftone image data regarding said at least one color component to generate single-color halftone image data that indicates sizes of a plurality of dots of said target color component that are respectively to be formed at said plurality of pixel positions in said halftone image region,
   said operation c) including:
   c1) performing halftone processing on one pixel in the image of said target color component and provisionally determining a size of a dot of said target color component that is to be formed at a pixel position corresponding to said one pixel;
   c2) obtaining a total dot size that is a sum of a previous total dot size and a provisional dot size, said previous total dot size being a sum of sizes of dots of said at least one color component that are to be formed at said pixel position, and said provisional dot size being the size of the dot of said target color component that is provisionally determined in said operation c1);

c3) comparing said total dot size with a threshold dot size at said pixel position, and in a case where said total dot size is smaller than or equal to said threshold dot size, determining that the size of the dot of said target color component is a size equal to said provisional dot size, and in a case where said total dot size is larger than said threshold dot size, determining that the size of the dot of said target color component is a largest dot size that is within a range of a difference between said threshold dot size and said previous total dot size;

c4) in a case where said total dot size is larger than said threshold dot size in said operation c3), changing a pixel value of a group of neighboring pixels at one or more pixel positions that are located around said one pixel and at which the size of the dot of said target color component has not yet been determined, on the basis of a pixel value of said one pixel and a difference between said provisional dot size and the size of the dot of said target color component; and c5) changing said one pixel to a next pixel in accordance with a predetermined processing order of said plurality of pixel positions and repeating said operations c1) to c4).

2. The image data generation method according to claim 1, wherein
said operations c1) to c4) are performed in sequential order from a pixel position at one end to a pixel position at the other end in a row or column of pixel positions in said halftone image region.

3. The image data generation method according to claim 1, wherein
in said operation c1), said provisional dot size is determined by comparing the pixel value of said one pixel with a threshold value that is set for said pixel position, and
in said operation c), said threshold value is changed during repetition of said operations c1) to c4).

4. The image data generation method according to claim 1, further comprising:
extracting a pixel position at which it is determined in said operation a) that a dot of a predetermined size or more is to be formed for one of said at least one color component, and reducing said threshold dot size at a pixel position adjacent to the extracted pixel position.

5. The image data generation method according to claim 1, wherein
single-color halftone image data regarding each of said plurality of color components is generated in a recording order in which the images of said plurality of color components are recorded onto a recording medium,
in said operation a), single-color halftone image data regarding black is first generated, and
in a case of generating single-color halftone image data regarding another color component other than black,
if, at each pixel position, only a black dot is formed as a dot of a color component preceding said another color component in said recording order, a sum of sizes of said black dot and a dot of said another color component is smaller than or equal to a predetermined maximum dot size, and
if said another color component is said target color component, said maximum dot size is increased as compared with a case where said another color component is a color component other than said target color component.

6. The image data generation method according to claim 1, wherein
said at least one color component includes black, and
said image data generation method further comprising:
equating said threshold dot size at a pixel position at which it is determined in said operation a) that a black dot is to be formed and a size of said black dot.

7. The image data generation method according to claim 1, further comprising:
prior to said operation a), performing separation processing along with gray-component replacement on said color image to generate a black image, a cyan image, a magenta image, and a yellow image.

8. An image data generation method of generating halftone image data through halftone processing performed on a multi-tone color image that includes images of a plurality of color components, the method comprising:
a) performing halftone processing on each image of at least one color component among said plurality of color components to generate single-color halftone image data regarding each of said at least one color component, said single-color halftone image data indicating sizes of a plurality of dots that are respectively to be formed at a plurality of pixel positions that are arranged in a matrix in a halftone image region;

b) obtaining a hue of each pixel that corresponds to each pixel position in said color image, and in a case where the hue of said each pixel is within a first hue range, determining that a threshold dot size at said each pixel position for a target color component is a predetermined reference threshold dot size, said target color component being included in said plurality of color components and being one color component other than said at least one color component, and in a case where the hue of said each pixel is within a second hue range in which coloration of said target color component is stronger than in said first hue range, determining that said threshold dot size is a predetermined corrected threshold dot size that is larger than said reference threshold dot size; and c) performing halftone processing on an image of said target color component with reference to the single-color halftone image data regarding said at least one color component to generate single-color halftone image data that indicates sizes of a plurality of dots of said target color component that are respectively to be formed at said plurality of pixel positions in said halftone image region, said operation c) including:
c1) performing halftone processing on the image of said target color component and provisionally determining sizes of said plurality of dots of said target color component that are respectively to be formed at said plurality of pixel positions in said halftone image region;

c2) obtaining a total dot size that is a sum of a previous total dot size and a provisional dot size, said previous total dot size being a sum of sizes of dots of said at least one color component that are to be formed at a pixel position corresponding to one pixel in the image of said target color component, and said provisional dot size being the size of the dot of said target color component that is provisionally determined in said operation c1);

c3) comparing said total dot size with a threshold dot size at said pixel position, and in a case where said total dot size is smaller than or equal to said threshold dot size, determining that the size of the dot of said target color component is a size equal to said provisional dot size, and in a case where said total dot size is larger than said threshold dot size, determining that the size of the dot of said target color component is a largest dot size that is within a range of a difference between said threshold dot size and said previous total dot size;

c4) in a case where said total dot size is larger than said threshold dot size in said operation c3), changing a provisional dot size of a group of neighboring pixels at one or more pixel positions that are located around said one pixel and at which the size of the dot of said target color component has not yet been determined, on the basis of a difference between said provisional dot size of said one pixel of said target color component and the size of the dot of said target color component; and c5) changing said one pixel to a next pixel in accordance with a predetermined processing order of said plurality of pixel positions and repeating said operations c2) to c4).

9. The image data generation method according to claim 8, wherein said operations c2) to c4) are performed in sequential order from a pixel position at one end to a pixel position at the other end in a row or column of pixel positions in said halftone image region.

10. The image data generation method according to claim 8, further comprising:

extracting a pixel position at which it is determined in said operation a) that a dot of a predetermined size or more is to be formed for one of said at least one color component, and reducing said threshold dot size at a pixel position adjacent to the extracted pixel position.

11. The image data generation method according to claim 8, wherein single-color halftone image data regarding each of said plurality of color components is generated in a recording order in which the images of said plurality of color components are recorded onto a recording medium, in said operation a), single-color halftone image data regarding black is first generated, and in a case of generating single-color halftone image data regarding another color component other than black, if, at each pixel position, only a black dot is formed as a dot of a color component preceding said another color component in said recording order, a sum of sizes of said black dot and a dot of said another color component is smaller than or equal to a predetermined maximum dot size, and if said another color component is said target color component, said maximum dot size is increased as compared with a case where said another color component is a color component other than said target color component.

12. The image data generation method according to claim 8, wherein said at least one color component includes black, and said image data generation method further comprising:

equating said threshold dot size at a pixel position at which it is determined in said operation a) that a black dot is to be formed and a size of said black dot.

13. The image data generation method according to claim 1, further comprising:

prior to said operation a), performing separation processing along with gray-component replacement on said color image to generate a black image, a cyan image, a magenta image, and a yellow image.

14. An image recording method of recording an image onto a recording medium, comprising:

preparing halftone image data that is generated by the image data generation method according to claim 1;

recording dots of said at least one color component onto a recording medium on the basis of said halftone image data; and recording dots of said target color component onto the recording medium on the basis of said halftone image data.

15. An image recording method of recording an image onto a recording medium, comprising:

preparing halftone image data that is generated by the image data generation method according to claim 8;

recording dots of said at least one color component onto a recording medium on the basis of said halftone image data; and recording dots of said target color component onto the recording medium on the basis of said halftone image data.

16. An image data generation apparatus for generating halftone image data through halftone processing performed on a multi-tone color image that includes images of a plurality of color components, the apparatus comprising:

at least one single-color halftone image data generation part that performs halftone processing on an image of at least one color component among said plurality of color components to generate single-color halftone image data regarding each of said at least one color component, said single-color halftone image data indicating sizes of a plurality of dots that are respectively to be formed at a plurality of pixel positions that are arranged in a matrix in a halftone image region;

a threshold dot size determination part that obtains a hue of each pixel that corresponds to each pixel position in said color image, and in a case where the hue of said each pixel is within a first hue range, determines that a threshold dot size at said each pixel position for a target color component is a predetermined reference threshold dot size, said target color component being included in said plurality of color components and being one color component other than said at least one color component, and in a case where the hue of said each pixel is within a second hue range in which coloration of said target color component is stronger than in said first hue range, determines that said threshold dot size is a predetermined corrected threshold dot size that is larger than said reference threshold dot size; and a target color component halftone image data generation part that performs halftone processing on an image of said target color component with reference to the single-color halftone image data regarding said at least one color component to generate single-color halftone image data that indicates sizes of a plurality of dots of said target color component that are respectively to be formed at said plurality of pixel positions in said halftone image region, said target color component halftone image data generation part including:

a provisional size determination pan that performs halftone processing on one pixel in the image of said target color component and provisionally determines a size of a dot of said target color component that is to be formed at a pixel position corresponding to said one pixel;

a dot size totaling part that obtains a total dot size that is a sum of a previous total dot size and a provisional dot size, said previous total dot size being a sum of sizes of dots of said at least one color component that are to be formed at said pixel position, and said provisional dot size being the size of the dot of said target color component that is provisionally determined by said provisional size determination part;

a size determination part that compares said total dot size with a threshold dot size at said pixel position, and in a case where said total dot size is smaller than or equal to said threshold dot size, determines that the size of the dot of said target color component is a size equal to said provisional dot size, and in a ease where said total dot size is larger than said threshold dot size, determines that the size of the dot of said target color component is a largest dot size that is within a range of a difference between said threshold dot size and said previous total dot size;

a pixel value changing part that, in a case where said total dot size is larger than said threshold dot size, changes a pixel value of a group of neighboring pixels at one or more pixel positions that are located around said one pixel and at which the size of the dot of said target color component has not yet been determined, on the basis of a pixel value of said one pixel and a difference between said provisional dot size and the size of the dot of said target color component; and a repetition control part that changes said one pixel to a next pixel in accordance with a predetermined processing order of said plurality of pixel positions and repeats the determination of said provisional dot size by said provisional size determination part, the calculation of said total dot size by said dot size totaling part, the determination of the size of the dot of said target color component by said size determination part, and the change of the pixel value by said pixel value changing part.

17. An image data generation apparatus for generating halftone image data through halftone processing performed on a multi-tone color image that includes images of a plurality of color components, the apparatus comprising:

at least one single-color halftone image data generation part that performs halftone processing on an image of at least one color component among said plurality of color components to generate single-color halftone image data regarding each of said at least one color component, said single-color halftone image data indicating sizes of a plurality of dots that are respectively to be formed at a plurality of pixel positions that are arranged in a matrix in a halftone image region;

a threshold dot size determination part that obtains a hue of each pixel that corresponds to each pixel position in said color image, and in a case where the hue of said each pixel is within a first hue range, determines that a threshold dot size at said each pixel position for a target color component is a predetermined reference threshold dot size, said target color component being included in said plurality of color components and being one color component other than said at least one color component, and in a case where the hue of said each pixel is within a second hue range in which coloration of said target color component is stronger than in said first hue range, determines that said threshold dot size is a predetermined corrected threshold dot size that is larger than said reference threshold dot size; and a target color component halftone image data generation part that performs halftone processing on an image of said target color component with reference to the single-color halftone image data regarding said at least one color component to generate single-color halftone image data that indicates sizes of a plurality of dots of said target color component that are respectively to be formed at said plurality of pixel positions in said halftone image region, said target color component halftone image data generation part including:

a provisional size determination part that performs halftone processing on the image of said target color component and provisionally determines sizes of said plurality of dots of said target color component that are respectively to be formed at said plurality of pixel positions in said halftone image region;

a dot size totaling part that obtains a total dot size that is a sum of a previous total dot size and a provisional dot size, said previous total dot size being a sum of sizes of dots of said at least one color component that are to be formed at a pixel position corresponding to one pixel in the image of said target color component, and said provisional dot size being the size of the dot of said target color component that is provisionally determined by said provisional size determination part;

a size determination part that compares said total dot size with a threshold dot size at said pixel position, and in a case where said total dot size is smaller than or equal to said threshold dot size, determines that the size of the dot of said target color component is a size equal to said provisional dot size, and in a case where said total dot size is larger than said threshold dot size, determines that the size of the dot of said target color component is a largest dot size that is within a range of a difference between said threshold dot size and said previous total dot size;

a provisional size changing part that, in a case where said total dot size is larger than said threshold dot size, changes a provisional dot size of a group of neighboring pixels at one or more pixel positions that are located around said one pixel and at which the size of the dot of said target color component has not yet been determined, on the basis of a difference between said provisional dot size of said one pixel of said target color component and the size of the dot of said target color component; and a repetition control part that changes said one pixel to a next pixel in accordance with a predetermined processing order of said plurality of pixel positions and repeats the calculation of said total dot size by said dot size totaling part, the determination of the size of the dot of said target color component by said size determination part, and the change of the provisional dot size by said provisional size changing part.

18. An image recording apparatus for recording an image onto a recording medium, comprising:

the image data generation apparatus according to claim 16;

a dot output element that records a dot at a dot recording position on a recording medium;

a movement mechanism that moves said dot recording position on said recording medium relative to said recording medium; and an output control part that performs output control of said dot output element on the basis of halftone image data that is generated by said image data generation apparatus, in parallel with the movement of said dot recording position on said recording medium relative to said recording medium.

19. The image recording apparatus according to claim 18, wherein said dot output element includes:

at least one ejecting part that is controlled by said output control part on the basis of the single-color halftone image data regarding said at least one color component, and ejects a fine droplet of ink of said at least one color component to said dot recording position on said recording medium to record a dot of said at least one color component; and a target color component ejecting part that is controlled by said output control part on the basis of said target color component halftone image data, and ejects a fine droplet of ink of said target color component to said dot recording position on said recording medium to record a dot of said target color component.

20. The image recording apparatus according to claim 19, wherein said target color component has a lower ink density than the ink density of said at least one color component.

21. An image recording apparatus for recording an image onto a recording medium, comprising:

the image data generation apparatus according to claim 17;

a dot output element that records a dot at a dot recording position on a recording medium;

a movement mechanism that moves said dot recording position on said recording medium relative to said recording medium; and an output control part that performs output control of said dot output element on the basis of halftone image data that is generated by said image data generation apparatus, in parallel with the movement of said dot recording position on said recording medium relative to said recording medium.

22. The image recording apparatus according to claim 21, wherein said dot output element includes:

at least one ejecting part that is controlled by said output control part on the basis of the single-color halftone image data regarding said at least one color component, and ejects a fine droplet of ink of said at least one color component to said dot recording position on said recording medium to record a dot of said at least one color component; and a target color component ejecting part that is controlled by said output control part on the basis of said target color component halftone image data, and ejects a fine droplet of ink of said target color component to said dot recording position on said recording medium to record a dot of said target color component.

23. The image recording apparatus according to claim 22, wherein said target color component has a lower ink density than the ink density of said at least one color component.

* * * * *